(12) United States Patent
Choi et al.

(10) Patent No.: US 10,375,412 B2
(45) Date of Patent: Aug. 6, 2019

(54) MULTI-LAYER VIDEO ENCODING METHOD AND APPARATUS, AND MULTI-LAYER VIDEO DECODING METHOD AND APPARATUS

(71) Applicant: SAMSUNG ELECTRONICS CO., LTD., Suwon-si (KR)

(72) Inventors: Byeong-doo Choi, Suwon-si (KR); Yong-jin Cho, Seoul (KR); Chan-yul Kim, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 15/111,292

(22) PCT Filed: Jan. 13, 2015

(86) PCT No.: PCT/KR2015/000341
§ 371 (c)(1),
(2) Date: Jul. 13, 2016

(87) PCT Pub. No.: WO2015/105399
PCT Pub. Date: Jul. 16, 2015

(65) Prior Publication Data
US 2016/0337657 A1    Nov. 17, 2016

Related U.S. Application Data

(60) Provisional application No. 61/926,681, filed on Jan. 13, 2014.

(51) Int. Cl.
*H04N 19/50* (2014.01)
*H04N 19/172* (2014.01)
(Continued)

(52) U.S. Cl.
CPC ........... *H04N 19/50* (2014.11); *H04N 19/172* (2014.11); *H04N 19/30* (2014.11); *H04N 19/44* (2014.11);
(Continued)

(58) Field of Classification Search
CPC ...... H04N 19/172; H04N 19/30; H04N 19/44; H04N 19/46; H04N 19/50; H04N 19/68; H04N 19/70
See application file for complete search history.

(56) References Cited

U.S. PATENT DOCUMENTS 8,391,672 B2    3/2013   Ikeda et al.
2014/0301439 A1* 10/2014 Chen ............... H04N 19/70
375/240.02
(Continued)

FOREIGN PATENT DOCUMENTS

JP    2007-295612 A    11/2007
KR   10-2013-0116217 A   10/2013
(Continued)

OTHER PUBLICATIONS

Search Report dated Mar. 30, 2015, issued by the International Searching Authority in counterpart International Application No. PCT/KR2015/000341 (PCT/ISA/210).
(Continued)

*Primary Examiner* — Francis Geroleo
(74) *Attorney, Agent, or Firm* — Sughrue Mion, PLLC

(57) ABSTRACT

Provided are multilayer video encoding/decoding methods. The multilayer video decoding method includes obtaining, from a bitstream, instantaneous decoder refresh (IDR) alignment information specifying whether at least one intra random access point (IRAP) picture for a random access and comprised in a same access unit is limited to being an IDR
(Continued)

| vps_vui( ) { | Descriptor |
|---|---|
| cross_layer_pic_type_aligned_flag | u(1) |
| if(!cross_layer_pic_type_aligned_flag) | |
| cross_layer_irap_aligned_flag | u(1) |
| if(cross_layer_irap_aligned_flag) | |
| all_layers_idr_aligned_flag | u(1) |
| bit_rate_present_vps_flag | |
| pic_rete_present_vps_flag | u(1) |
| ... | | picture; and reconstructing a multilayer video by decoding encoded data by using the IDR alignment information.

10 Claims, 29 Drawing Sheets

(51) Int. Cl.
    *H04N 19/44*     (2014.01)
    *H04N 19/30*     (2014.01)
    *H04N 19/46*     (2014.01)
    *H04N 19/70*     (2014.01)
    *H04N 19/68*     (2014.01)

(52) U.S. Cl.
    CPC ............. *H04N 19/46* (2014.11); *H04N 19/68* (2014.11); *H04N 19/70* (2014.11)

(56) References Cited

U.S. PATENT DOCUMENTS

| | | |
|---|---|---|
| 2015/0063463 A1 | 3/2015 | Choi et al. |
| 2015/0092836 A1 | 4/2015 | Kang et al. |
| 2015/0103923 A1* | 4/2015 | Ramasubramonian ...................... H04N 19/80 375/240.26 |
| 2015/0124864 A1 | 5/2015 | Kim et al. |
| 2015/0215632 A1 | 7/2015 | Choi et al. |
| 2016/0044309 A1* | 2/2016 | Choi ....................... H04N 19/50 375/240.12 |
| 2016/0088306 A1* | 3/2016 | Sjoberg ................. H04N 19/187 375/240.02 |
| 2016/0241850 A1* | 8/2016 | Deshpande ............ H04N 19/70 |
| 2016/0316210 A1* | 10/2016 | Lee ......................... H04N 19/30 |
| 2016/0330459 A1* | 11/2016 | Choi ..................... H04N 19/597 |

FOREIGN PATENT DOCUMENTS

| | | |
|---|---|---|
| KR | 10-2013-0118254 A | 10/2013 |
| WO | 2014/003379 A1 | 1/2014 |
| WO | 2014/007590 A1 | 1/2014 |

OTHER PUBLICATIONS

Written Opinion dated Mar. 30, 2015, issued by the International Searching Authority in counterpart International Application No. PCT/KR2015/000341 (PCT/ISA/237).

* cited by examiner

FIG. 3

| nal_unit_header( ) { | Descriptor |
|---|---|
|    forbidden_zero_bit | f(1) |
|    nal_unit_type | u(6) |
|    nuh_layer_id | u(6) |
|    nuh_temporal_id_plus1 | u(3) |
| } | |

FIG. 5

| vps_vui( ) { | Descriptor |
|---|---|
| cross_layer_pic_type_aligned_flag | u(1) |
| if(!cross_layer_pic_type_aligned_flag) | |
| cross_layer_irap_aligned_flag | u(1) |
| if(cross_layer_irap_aligned_flag) | |
| all_layers_idr_aligned_flag | u(1) |
| bit_rate_present_vps_flag | |
| pic_rete_present_vps_flag | u(1) |
| ... | |

FIG. 7

| | Descriptor |
|---|---|
| slice_segment_header( ) { | |
| ... | |
| if((nuh_layer_id> 0 && !poc_lsb_not_present_flag[LayerIdxInVPS[nuh_layer_id]] && !cross_layer_irap_aligned_idc) <br> || (nal_unit_type != IDR_W_RADL && nal_unit_type!= IDR_N_LLP ) ) | |
| slice_pic_order_cnt_lsb | u(v) |
| ... | |

PARTITION MODE (1500)

PREDICTION MODE (1510)

TRANSFORMATION UNIT SIZE (1520)

CODING UNIT (1710)

MULTI-LAYER VIDEO ENCODING METHOD AND APPARATUS, AND MULTI-LAYER VIDEO DECODING METHOD AND APPARATUS

TECHNICAL FIELD

The present invention relates to video encoding methods and video decoding methods, and more particularly, to methods of transmitting a parameter including information about a multilayer.

BACKGROUND ART

As hardware for reproducing and storing high resolution or high quality video content is being developed and supplied, a need for a video codec for effectively encoding or decoding the high resolution or high quality video content is increasing. According to a video codec of the related art, a video is encoded according to a limited encoding method based on coding units of a tree structure.

Image data of a spatial domain is transformed into coefficients of a frequency domain via frequency transformation. According to a video codec, an image is split into blocks of predetermined size, discrete cosine transformation (DCT) is performed on each block, and frequency coefficients are encoded in block units, for rapid calculation of frequency transformation. In order to remove the redundancy between color images, compression systems of the related art perform block-based prediction. The compression systems of the related art generate parameters used for video encoding and decoding in picture units.

DETAILED DESCRIPTION OF THE INVENTION

Technical Problem

The present invention provides methods of efficiently encoding and decoding a multilayer video.

Technical Solution

Provided is a multilayer video decoding method including obtaining, from a bitstream, instantaneous decoder refresh (IDR) alignment information specifying whether at least one intra random access point (IRAP) picture for a random access and included in a same access unit is limited to being an IDR picture; and reconstructing a multilayer video by decoding encoded data by using the IDR alignment information.

Advantageous Effects of the Invention

By using multilayer video encoding/decoding methods according to various embodiments, efficiency in encoding/decoding may be improved.

DESCRIPTION OF THE DRAWINGS

FIG. 3 illustrates a diagram of a header of a network abstraction layer (NAL) unit, according to various embodiments.

FIG. 5 illustrates syntax of a video parameter set (VPS), according to an embodiment.

FIG. 7 illustrates a diagram for describing a method of using instantaneous decoder refresh (IDR) arrangement information, according to various embodiments of the present invention.

BEST MODE

Figure 1A:
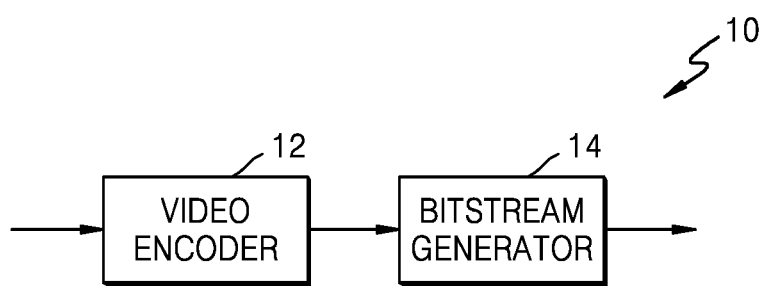
FIG. 1A is a block diagram of a video encoding apparatus 10, according to an embodiment of the present invention.

According to a first aspect of the present invention, there is provided a multilayer video decoding method including obtaining, from a bitstream, instantaneous decoder refresh (IDR) alignment information specifying whether at least one intra random access point (IRAP) picture for a random access and included in a same access unit is limited to being an IDR picture; and reconstructing a multilayer video by decoding encoded data by using the IDR alignment information.

When a value of the IDR alignment information is 1 and the at least one IRAP picture is included in the same access unit, the at least one IRAP picture may be limited to being the IDR picture.

When a value of the IDR alignment information is 1 and the at least one IRAP picture is included in the same access unit, all pictures included in the same access unit may be limited to being IDR pictures.

The same access unit may include pictures whose picture order counts (POCs) are equal to each other from among pictures included in the multilayer video.

The IDR alignment information may be obtained from a video parameter set network abstraction layer (VPS NAL) unit included in the bitstream.

In the reconstructing of the multilayer video, when a value of the IDR alignment information is 1, POC information regarding pictures included in the same access unit as the at least one IRAP picture may not be obtained.

When a value of picture type alignment information obtained from the bitstream and specifying whether all pictures included in the same access unit have a same picture type is 0, and when a value of IRAP alignment information obtained from the bitstream and specifying whether a picture referring to the IRAP picture has a same picture type as the at least one IRAP picture, the picture being from among pictures included in the same access unit, is 1, the obtaining of the IDR alignment information from the bitstream may include obtaining the IDR alignment information.

According to a second aspect of the present invention, there is provided a multilayer video decoding apparatus including a video decoder configured to obtain, from a bitstream, instantaneous decoder refresh (IDR) alignment information specifying whether at least one intra random access point (IRAP) picture for a random access and included in a same access unit is limited to being an IDR picture, and to reconstruct a multilayer video by decoding encoded data by using the IDR alignment information.

When a value of the IDR alignment information is 1 and the at least one IRAP picture is included in the same access unit, the at least one IRAP picture may be limited to being the IDR picture.

When a value of the IDR alignment information is 1 and the at least one IRAP picture is included in the same access unit, all pictures included in the same access unit may be limited to being IDR pictures.

The same access unit may include pictures whose picture order counts (POCs) are equal to each other from among pictures included in the multilayer video.

When a value of picture type alignment information obtained from the bitstream and specifying whether all pictures included in the same access unit have a same picture type is 0, and when a value of IRAP alignment information obtained from the bitstream and specifying whether a picture referring to the at least one IRAP picture has a same picture type as the at least one IRAP picture, the picture being from among pictures included in the same access unit, is 1, the video decoder may be further configured to obtain the IDR alignment information.

According to a third aspect of the present invention, there is provided a multilayer video encoding method including generating base layer encoded data and enhancement layer encoded data by encoding an input image; generating a network abstraction layer (NAL) unit including instantaneous decoder refresh (IDR) alignment information that is commonly used in decoding the base layer encoded data and the enhancement layer encoded data and specifies whether at least one intra random access point (IRAP) picture for a random access and included in a same access unit is limited to being an IDR picture; and generating a bitstream including the NAL unit.

According to a fourth aspect of the present invention, there is provided a multilayer video encoding apparatus including a video encoder configured to generate a network abstraction layer (NAL) unit including instantaneous decoder refresh (IDR) alignment information that is commonly used in decoding base layer encoded data and enhancement layer encoded data and specifies whether at least one intra random access point (IRAP) picture for a random access and included in a same access unit is limited to being an IDR picture; and a bitstream generator configured to generate a bitstream including the NAL unit.

Mode of the Invention

Hereinafter, video encoding methods and video decoding methods for determining a method of predicting a variation vector or a motion vector according to the characteristics of a neighboring block adjacent to a current block according to various embodiments will be described with reference to FIGS. 1A through 7.

Also, video encoding schemes and video decoding schemes based on coding units of a tree structure according to various embodiments, which are applicable to the above video encoding methods and video decoding methods, will be described with reference to FIGS. 8 through 20.

Also, various embodiments, to which the above video encoding methods and video decoding methods are applicable, will be described with reference to FIGS. 21 through 27.

Hereinafter, an 'image' may indicate a still image of a video or a moving picture, i.e., the video itself.

Hereinafter, a 'sample' means data that is allocated to a sampling position of an image and is a processing target. For example, pixels in an image in a spatial domain may be samples.

A current block (current color block) refers to a block of a color image to be encoded or decoded.

A current color image refers to a color image including a current block. In more detail, the current color image indicates a color image including a block to be encoded or decoded.

A depth image corresponding to a current block refers to a depth image corresponding to a color image (current color image) including a current block. For example, the depth image is an image representing a depth value of a color image including the current block.

A neighboring block indicates at least one encoded or decoded block that is around the current block. For example, the neighboring block may be located at an upper side of the current block, at an upper right side of the current block, at a left side of the current block, at a lower left side of the current block, or at an upper left side of the current block.

A co-located depth block refers to a depth image block included in the depth image corresponding to the current block. For example, the co-located block may include a block located at a same location as the current block in the depth image corresponding to the color image.

A co-located depth macroblock refers to a depth image block of an upper concept including the co-located depth block.

A neighboring color image refers to a color image having a view different from a view of the color image including the current block. The neighboring color image may be a color image that is encoded or decoded before an image processing process is performed on the current block.

First, a video encoding apparatus, a video encoding method, a video decoding apparatus, and a video decoding method according to an embodiment will be described with reference to FIGS. 1A through 7.

Provided is a method of performing multilayer image encoding and decoding. For example, multiview video coding (MVC) and scalable video coding (SVC) provide image encoding and decoding methods using a plurality of layers.

The MVC is a method of compressing a multiview video. The multiview video refers to a stereoscopic image obtained by simultaneously capturing one scene from various viewpoints by using several cameras. In general, in the MVC, a base view image is encoded to a base layer, and an additional view image is encoded to an enhancement layer.

The stereoscopic image refers to a three-dimensional (3D) image that provides shape information about depth and space simultaneously. Unlike to a stereo image that simply provides images corresponding to different views to the left and right eyes, respectively, images captured from several viewpoints are necessary to provide an image as if viewed in a different direction whenever a viewer changes a view. Since the amount of data of the images captured from the several viewpoints is huge, when it is compressed by using an encoder optimized for single-view video coding such as MPEG-2 and H.264/AVC, the amount of data to be transmitted is huge. Thus, in this case, by taking into account a network infrastructure, a terrestrial bandwidth, and the like, it is not really feasible to provide the image as if viewed in a different direction whenever the viewer changes a view.

Thus, instead of completely compressing and transmitting the video corresponding to a plurality of views, if a depth image is generated and then is compressed and transmitted along with images corresponding to some views from among images corresponding to the plurality of views, the amount of data generated in a compression process may be reduced. Since the depth image is an image in which a distance between a viewer and an object in a color image is specified as a value of 0 through 255, a characteristic of the depth image is similar to that of the color image. In general, a 3D video includes a depth image and color images corresponding to several views. However, since 3D videos not only have a temporal redundancy between temporally-consecutive images but also have a large inter-view redundancy between different views, when an encoding system is used to perform compression to efficiently remove the redundancy between different views, a stereoscopic image may be transmitted using a smaller amount of data.

The SVC is an image compression method for providing services that are hierarchically (scalably) various in temporal, spatial, and image-quality aspects according to various user environments such as resolutions of terminals or network conditions in various multimedia environments. In the SVC, the base layer encoded data generally includes data for encoding a low-resolution image, and the enhancement layer encoded data generally includes encoded data for encoding a high-resolution image by being encoded together with the base layer encoded data.

FIG. 1A is a block diagram of a video encoding apparatus 10, according to an embodiment of the present invention. The video encoding apparatus 10 according to various embodiments may include a video encoder 12 and a bitstream generator 14.

The video encoding apparatus 10 according to various embodiments may include the video encoder 12 and the bitstream generator 14. The video encoder 12 may generate base layer encoded data by encoding an input image. Also, the video encoder 12 may generate enhancement layer encoded data by encoding the input image.

The video encoding apparatus 10 may separately generate the base layer encoded data and the enhancement layer encoded data so as to prevent the base layer encoded data and the enhancement layer encoded data from referring to each other with respect to the input image.

In addition, the video encoder 12 may generate the enhancement layer encoded data by using the base layer encoded data. For example, the video encoding apparatus 10 may generate the enhancement layer encoded data by encoding the input image based on the base layer encoded data.

The video encoding apparatus 10 may generate instantaneous decoder refresh (IDR) alignment information that is commonly used in decoding the base layer encoded data and the enhancement layer encoded data.

The IDR alignment information may specify whether an intra random access point (RAP) picture for a random access and included in a same access unit is limited to being an IDR picture.

For example, when a value of IDR alignment information generated by the video encoder 12 of the video encoding apparatus 10 is 1, and at least one of pictures included in the same access unit is an RAP picture, all the pictures included in the same access unit may be limited to being IDR pictures.

For example, when a value of IDR alignment information generated by the video encoder 12 of the video encoding apparatus 10 is 1, and a picture of a first layer image is an IRAP picture, a second layer picture included in a same access unit as the picture of the first layer image and a third layer picture included in the same access unit as the picture of the first layer image may be IDR pictures.

Also, when a value of IDR alignment information generated by the video encoder 12 of the video encoding apparatus 10 is 1, and at least one of pictures included in the same access unit is an IRAP picture, the at least one IRAP picture may be limited to being an IDR picture.

For example, when a value of IDR alignment information generated by the video encoder 12 of the video encoding apparatus 10 is 1, and a picture of a first layer image is an IRAP picture, the picture of a first layer image may be limited to being an IDR picture.

The video encoder 12 of the video encoding apparatus 10 may generate various types of network abstraction layer (NAL) units. For example, the video encoding apparatus 10 may generate the NAL units such as a video parameter set (VPS) NAL unit, a sequence parameter set (SPS) NAL unit, a picture parameter set (PPS) NAL unit, etc., and examples of the NAL units are not limited thereto and the video encoding apparatus 10 may generate various types of NAL units.

The video encoder 12 of the video encoding apparatus 10 may generate a NAL unit including IDR alignment information. For example, the video encoder 12 of the video encoding apparatus 10 may generate a VPS NAL unit including the IDR alignment information.

The bitstream generator 14 generates a bitstream including the VPS NAL unit. For example, the bitstream generator 14 may generate a bitstream including the VPS NAL unit, the SPS NAL unit, and the PPS NAL unit.

Hereinafter, operations by the inter-layer video encoding apparatus 10 using the IDR alignment information will now be described in detail with reference to FIG. 1B.

Figure 1B:
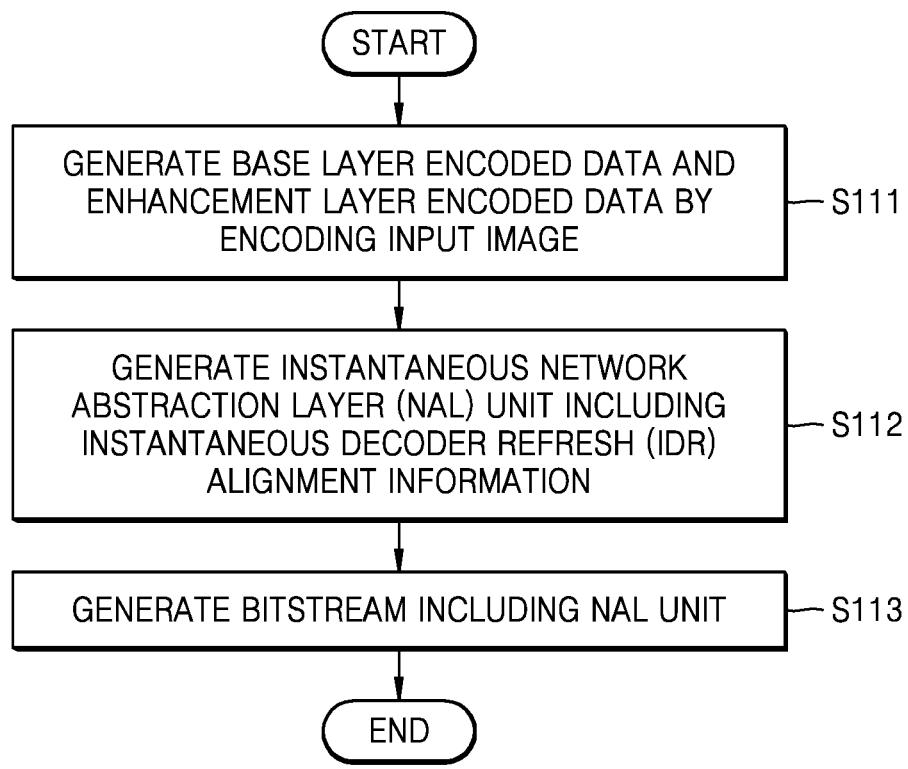
FIG. 1B illustrates a flowchart of a video encoding method performed by the video encoding apparatus 10, according to an embodiment of the present invention.

FIG. 1B illustrates a flowchart of a video encoding method performed by the video encoding apparatus 10, according to an embodiment of the present invention.

In operation S111, the video encoding apparatus 10 may generate a base layer encoded data and an enhancement layer encoded data by encoding an input image.

For example, the video encoding apparatus 10 generates the base layer encoded data by encoding the input image. Also, the video encoding apparatus 10 generates the enhancement layer encoded data by encoding the input image. The base layer encoded data and the enhancement layer encoded data may be generated with respect to the input image independently without reference to each other, or the video encoding apparatus 10 may generate the enhancement layer encoded data by using the base layer encoded data. For example, the video encoding apparatus 10 may generate the enhancement layer encoded data by encoding the input image based on the base layer encoded data.

In operation S112, the video encoding apparatus 10 may generate a NAL unit including IDR alignment information.

The video encoding apparatus 10 according to an embodiment may generate the IDR alignment information that is commonly used to encode the base layer encoded data and the enhancement layer encoded data.

The IDR alignment information may specify whether an IRAP picture for a random access and included in a same access unit is limited to being an IDR picture.

For example, when the video encoding apparatus 10 sets a value of the IDR alignment information as 1, the IRAP picture for the random access and included in a bitstream may be limited to being an IDR picture. In other words, when the value of the IDR alignment information generated by the video encoding apparatus 10 is 1, the bitstream does not include a clean random access (CRA) picture and a broken link access (BLA) picture.

Also, when the value of the IDR alignment information generated by the video encoding apparatus 10 is 1, and at least one of pictures included in the same access unit is an IRAP picture, all pictures included in the same access unit may be IDR pictures.

For example, when the value of the IDR alignment information generated by the video encoding apparatus 10 is 1, and a picture of a first layer image is an IRAP picture, a second layer picture included in the same access unit as the picture of the first layer image and a third layer picture included in the same access unit as the picture of the first layer image may be IDR pictures.

Also, when the value of the IDR alignment information generated by the video encoding apparatus 10 is 1, and at least one of pictures included in the same access unit is an IRAP picture, the at least one IRAP picture may be limited to being an IDR picture.

For example, when the value of the IDR alignment information generated by the video encoding apparatus 10 is 1, and the picture of the first layer image is the IRAP picture, the picture of the first layer image may be limited to being an IDR picture.

The video encoding apparatus 10 may generate various types of NAL units. For example, the video encoding apparatus 10 may generate the NAL units such as a VPS NAL unit, a SPS NAL unit, a PPS NAL unit, etc., and examples of the NAL units are not limited thereto and the video encoding apparatus 10 may generate various types of NAL units.

The video encoding apparatus 10 may generate a NAL unit including the IDR alignment information. For example, the video encoding apparatus 10 may generate a VPS NAL unit including the IDR alignment information.

In operation S113, the video encoding apparatus 10 may generate a bitstream including the NAL unit. For example, the video encoding apparatus 10 may generate a bitstream including the VPS NAL unit, the SPS NAL unit, and the PPS NAL unit.

Figure 2A:
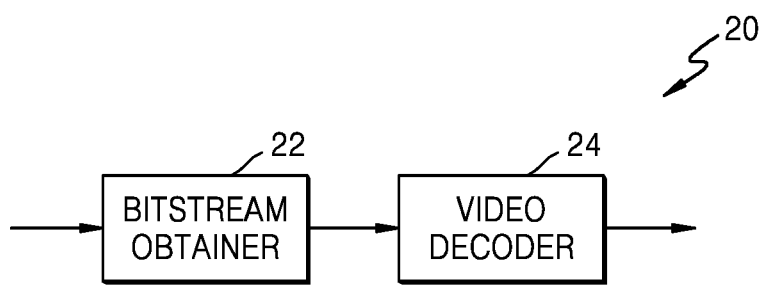
FIG. 2A illustrates a block diagram of a video decoding apparatus 20, according to an embodiment of the present invention.

FIG. 2A illustrates a block diagram of a video decoding apparatus 20, according to an embodiment of the present invention. The video decoding apparatus 20 according to various embodiments may include a bitstream obtainer 22 and a video decoder 24.

The bitstream obtainer 22 of the video decoding apparatus 20 obtains a bitstream of an encoded image.

The video decoder 24 may obtain IDR alignment information from the bitstream. For example, the video decoder 24 may obtain a VPS NAL unit from the bitstream. Also, the video decoder 24 may obtain the IDR alignment information from the VPS NAL unit.

The video decoder 24 may decode base layer encoded data and enhancement layer encoded data by using the IDR alignment information. For example, the video decoder 24 may decode multilayer encoded data from the bitstream by using the base layer encoded data, the enhancement layer encoded data, and the IDR alignment information.

The base layer encoded data and the enhancement layer encoded data may be decoded with respect to the input image independently without reference to each other. When at least one of the base layer encoded data and the enhancement layer encoded data refers to the other one, the video decoder 24 may decode an image by using the reference relationship. For example, when the enhancement layer encoded data refers to the base layer encoded data, the video decoder 24 may decode the enhancement layer encoded data by using the base layer encoded data.

The IDR alignment information may specify whether an IRAP picture for a random access and included in a same access unit is limited to being an IDR picture.

Hereinafter, operations by the video decoding apparatus 20 using the IDR alignment information will now be described in detail with reference to FIG. 2B.

Figure 2B:
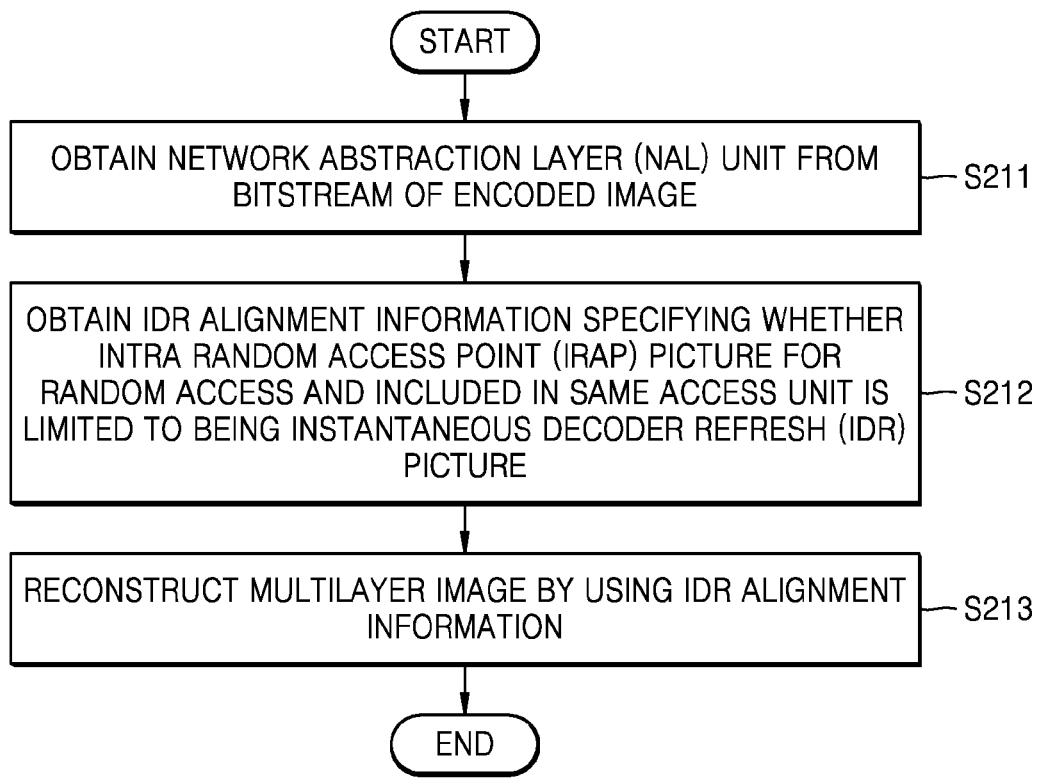
FIG. 2B illustrates a flowchart of a video decoding method performed by the video decoding apparatus 20, according to an embodiment of the present invention.

FIG. 2B illustrates a flowchart of a video decoding method performed by the video decoding apparatus 20, according to an embodiment of the present invention.

In operation S211, the video decoding apparatus 20 may obtain a bitstream of an encoded image. The bitstream obtained by the video decoding apparatus 20 may include a NAL unit. For example, the bitstream may include a VPS NAL unit, a SPS NAL unit, and a PPS NAL unit.

In operation S212, the video decoding apparatus 20 may obtain IDR alignment information specifying whether an IRAP picture for a random access and included in a same access unit is limited to being an IDR picture.

The video decoding apparatus 20 may use a random access scheme to reproduce video data. The random access scheme means a method of performing reproduction from a random access point (RAP) picture that may be independently reconstructed. For example, the video decoding apparatus 20 may jump to a RAP picture at a predetermined position and may reproduce the RAP picture.

The RAP picture may include an IRAP picture. The IRAP picture indicates a picture to be encoded/decoded according to an intra mode, the picture being from among RAP pictures.

The IRAP picture may include an IDR picture, a CRA picture and a BLA picture.

The IDR picture means an intra picture for refreshing a buffer of a decoding apparatus when the IDR picture is decoded. For example, when the IDR picture is decoded, a decoded picture buffer (DPB) included in the video decoding apparatus 20 marks a picture that is a previously-decoded picture other than the IDR picture as a picture unused for reference, and initializes a POC. Also, a picture decoded after the IDR picture always follows the IDR picture in an output order and is decoded without reference to a picture preceding the IDR picture.

The CRA picture indicates a picture including only an I slice and has pictures that precede the CRA picture in a display order but follow the CRA picture in an encoding order. A picture, which precedes the CRA picture in the display order but follows the CRA picture in the encoding order, is defined as a leading picture.

The BLA picture is a picture that is obtained by subdividing the CRA picture according to splicing positions. The CRA picture may be classified as the BLA picture according to whether the CRA picture has a leading picture, whether the CRA picture has a random access decodable leading (RADL) picture, or whether the CRA picture has a random access skip leading (RASL) picture.

Each of the decoding order and the encoding order refers to the order of processing pictures in each of the decoding apparatus and the encoding apparatus. Since the encoding apparatus sequentially encodes pictures according to a picture input order and the decoding apparatus decodes the encoded pictures according to a picture receiving order, the picture encoding order is the same as the picture decoding order.

The access unit denotes a group of pictures that have the same reproduction order and are from among pictures included in different layers.

For example, pictures included in the same access unit have the same POC. In more detail, when a POC of a first picture included in a first layer is equal to a POC of a second picture included in a second layer, the first picture and the second picture may be included in the same access unit.

The video decoding apparatus 20 may obtain the IDR alignment information. For example, the video decoding apparatus 20 may obtain the IDR alignment information from a VPS unit included in a bitstream.

The video decoding apparatus 20 may determine whether to obtain the IDR alignment information, based on a value of picture type arrangement information obtained from the bitstream. For example, when the value of the picture type arrangement information obtained from the bitstream is 0, the video decoding apparatus 20 may parse the IDR alignment information.

The picture type arrangement information indicates whether all pictures in the same access unit have a same picture type. For example, when the picture type arrangement information obtained from the bitstream corresponds to 1, values of "nal_unit_type" of pictures included in the same access unit are the same, the pictures being from among pictures included in the bitstream.

The video decoding apparatus 20 may determine whether or not to parse the IDR alignment information, based on a value of IRAP arrangement information obtained from the bitstream. For example, when the value of the IRAP arrangement information that the video decoding apparatus 20 obtained from the bitstream is 1, the video decoding apparatus 20 may parse the IDR alignment information.

The IRAP arrangement information indicates whether a picture that refers to an IRAP picture, the picture being from among pictures included in the same access unit, has a same picture type as that of the IRAP picture. For example, when the IRAP arrangement information that the video decoding apparatus 20 obtained from the bitstream corresponds to 1, and a first picture of a first layer is an IRAP picture, values of "nal_unit_type" of pictures that are included in layers different from the first layer and are included in the same access unit as the first picture may be equal to a value of "nal_unit_type" of the first picture.

The video decoding apparatus 20 may determine whether or not to parse the IDR alignment information, based on the value of the picture type arrangement information and the value of the IRAP arrangement information obtained from the bitstream.

For example, when the value of the picture type arrangement information that the video decoding apparatus 20 obtained from the bitstream is 0, the video decoding apparatus 20 may parse the IRAP arrangement information, and when a value of the parsed IRAP arrangement information is 1, the video decoding apparatus 20 may parse the IDR alignment information.

The IDR alignment information may specify whether an IRAP picture for a random access and included in a same access unit is limited to being an IDR picture.

For example, when a value of the IDR alignment information that the video decoding apparatus 20 obtained from the bitstream is 1, the IRAP picture for the random access and included in the bitstream may be limited to being the IDR picture. In other words, when the value of the IDR alignment information that the video decoding apparatus 20 obtained from the bitstream is 1, the bitstream does not include a CRA picture and a BLA picture.

Also, when the value of the IDR alignment information that the video decoding apparatus 20 obtained from the bitstream is 1, and at least one of pictures included in the same access unit is the IRAP picture, all pictures included in the same access unit may be IDR pictures.

For example, when the bitstream includes a first layer image, a second layer image, and a third layer image, the value of the IDR alignment information that the video decoding apparatus 20 obtained is 1, and a picture of the first layer image is the IRAP picture, the second layer picture included in the same access unit as the picture of the first layer image and the third layer picture included in the same access unit as the picture of the first layer image may be IDR pictures.

Also, when the value of the IDR alignment information that the video decoding apparatus 20 obtained from the bitstream is 1, and at least one of the pictures included in the same access unit is the IRAP picture, the IRAP picture may be limited to being an IDR picture.

For example, when the bitstream includes the first layer image, the second layer image, and the third layer image, the value of the IDR alignment information that the video decoding apparatus 20 obtained is 1, and the picture of the first layer image is the IRAP picture, the picture of the first layer image may be limited to being the IDR picture.

In operation S213, the video decoding apparatus 20 may reconstruct the multilayer video image by using the IDR alignment information.

The video decoding apparatus 20 may obtain the base layer encoded data from the bitstream. Also, the video decoding apparatus 20 may reconstruct a base layer image by using the obtained base layer encoded data and the obtained IDR alignment information.

The video decoding apparatus 20 may further obtain the enhancement layer encoded data from the bitstream. Also, the video decoding apparatus 20 may reconstruct the multilayer video image by using the obtained base layer encoded data, the obtained enhancement layer encoded data, the obtained IDR alignment information, or a combination thereof.

FIG. 3 illustrates a diagram of a header of a NAL unit, according to various embodiments.

The NAL unit may include a NAL header and a raw byte sequence payload (RBSP).

As illustrated in FIG. 3, the header of the NAL unit may include nal_unit_type information. The nal_unit_type represents a type of the NAL unit. For example, the nal_unit_type may indicate whether the NAL unit is a NAL unit related to a parameter set or a NAL unit including encoded data. For example, the nal_unit_type may indicate whether the NAL unit is a VPS NAL unit, a SPS NAL unit, or a PPS NAL unit.

The video decoding apparatus 20 according to an embodiment may determine a type of the NAL unit by using the nal_unit_type information of the header information of the NAL unit read from a bitstream.

Figure 4:
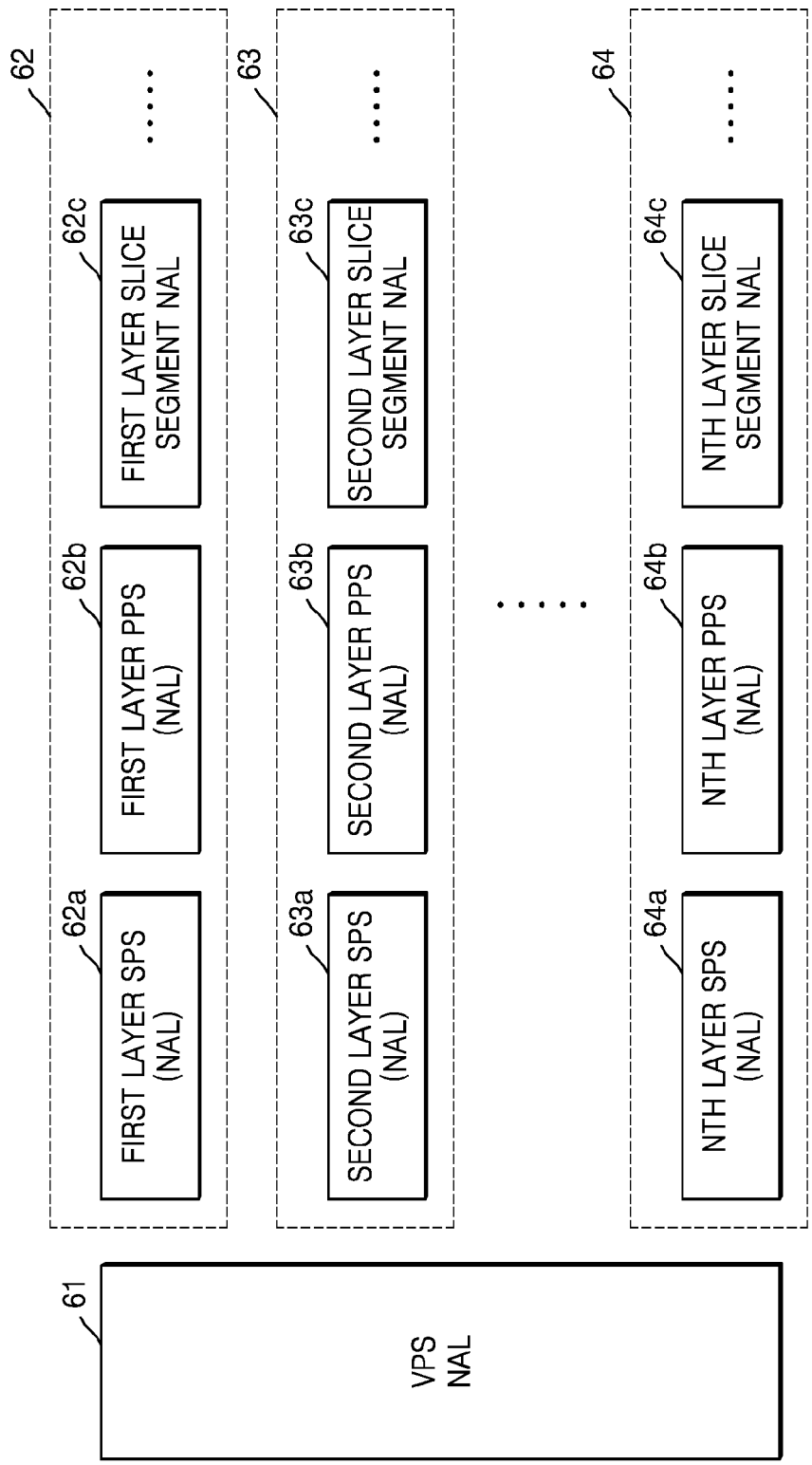
FIG. 4 illustrates NAL units including encoded data of a multilayer video, according to an embodiment of the present invention.

FIG. 4 illustrates NAL units including encoded data of a multilayer video, according to an embodiment of the present invention.

The bitstream generator 14 outputs NAL units including encoded multilayer video data and additional information.

A video parameter set (VPS) includes information applied to multilayer image sequences 62, 63, and 64 included in the multilayer video. A NAL unit that includes information regarding the VPS is a VPS NAL unit 61.

The VPS NAL unit 61 includes a common syntax element shared among the multilayer image sequences 62, 63, and 64, information regarding an operation point, essential information regarding an operation point such as a profile or a level which is required in a session negotiation process, or the like to prevent transmission of unnecessary information. In particular, the VPS NAL unit 61 according to an embodiment includes scalability information regarding a scalability identifier for implementing scalability in the multilayer video. The scalability information is for determining scalability to be applied to the multilayer image sequences 62, 63, and 64 included in the multilayer video.

The scalability information includes a type and dimension of the scalability to be applied to the multilayer image sequences 62, 63, and 64 included in the multilayer video. According to encoding and decoding methods according to a first embodiment of the present invention, the scalability information may be directly obtained from a value of a layer identifier included in a header of a NAL unit. Each layer identifier is an identifier for distinguishing between a plurality of layers included in a VPS. The VPS may signal each layer identifier for each layer via VPS extension. Each layer identifier of the VPS for each layer may be included in the VPS NAL unit and then may be signaled. For example, a layer identifier of NAL units belonging to a particular layer of the VPS may be included in a VPS NAL unit. For example, a layer identifier of a NAL unit belonging to the VPS may be signaled via VPS extension. Therefore, according to the encoding and decoding methods according to the embodiment of the present invention, scalability information regarding a layer of NAL units belonging to a VPS may be obtained by using a value of a layer identifier of the NAL units by using the VPS.

FIG. 5 illustrates syntax of a VPS, according to an embodiment.

The video decoding apparatus 20 may obtain IDR alignment information (all_Layers_idr_aligned_flag) specifying whether an IRAP picture for a random access and included in a same access unit is limited to being an IDR picture.

The video decoding apparatus 20 may obtain the IDR alignment information (all_Layers_idr_aligned_flag). For example, the video decoding apparatus 20 may obtain the IDR alignment information (all_Layers_idr_aligned_flag) from a VPS NAL unit included in a bitstream.

Referring to FIG. 4, the video decoding apparatus 20 may determine whether to parse the IDR alignment information (all_Layers_idr_aligned_flag), based on a value of picture type alignment information (cross_layer_pic_type_aligned_flag) and a value of IRAP alignment information (cross_layer_irap_aligned_flag) obtained from the bitstream.

For example, when the value of the picture type alignment information (cross_layer_pic_type_aligned_flag) that the video decoding apparatus 20 obtained from the bitstream is 0, the video decoding apparatus 20 may parse the IRAP alignment information, and when the value of the IRAP alignment information parsed by the video decoding apparatus 20 is 1, the video decoding apparatus 20 may parse the IDR alignment information (all_Layers_idr_aligned_flag).

The picture type alignment information (cross_layer_pic_type_aligned_flag) specifies whether all pictures in the same access unit have a same picture type. For example, when the picture type alignment information (cross_layer_pic_type_aligned_flag) that the video decoding apparatus 20 obtained from the bitstream corresponds to 1, values of "nal_unit_type" of the pictures in the same access unit are the same, the pictures being from among pictures included in the bitstream.

The IRAP alignment information (cross_layer_irap_aligned_flag) specifies whether a picture that refers to an IRAP picture from among the pictures in the same access unit has a same picture type as that of the IRAP picture. For example, when the IRAP alignment information (cross_layer_irap_aligned_flag) that the video decoding apparatus 20 obtained from the bitstream corresponds to 1, and a first picture of a first layer is the IRAP picture, values of "nal_unit_type" of pictures that are included in a layer different from the first layer and are included in a same access unit as the first picture may be equal to a value of "nal_unit_type" of the first picture.

The IDR alignment information (all_Layers_idr_aligned_flag) may specify whether an IRAP picture for a random access and included in a same access unit is limited to being an IDR picture.

For example, when a value of the IDR alignment information (all_Layers_idr_aligned_flag) that the video decoding apparatus 20 obtained from the bitstream is 1, the IRAP picture for the random access and included in the bitstream may be limited to being the IDR picture. In other words, when the value of the IDR alignment information (all_Layers_idr_aligned_flag) that the video decoding apparatus 20 obtained from the bitstream is 1, the bitstream does not include a CRA picture and a BLA picture.

When the value of the IDR alignment information (all_Layers_idr_aligned_flag) that the video decoding apparatus 20 obtained from the bitstream is 1, and at least one of the pictures included in the same access unit is an RAP picture, the pictures included in the same access unit may be IDR pictures.

For example, when the bitstream includes a first layer image, a second layer image, and a third layer image, the value of the IDR alignment information (all_Layers_idr_aligned_flag) that the video decoding apparatus 20 obtained from the bitstream is 1, and a picture of the first layer image is an IRAP picture, a second layer picture included in a same access unit as the picture of the first layer image and a third layer picture included in the same access unit as the picture of the first layer image may be IDR pictures.

In addition, when the value of the IDR alignment information (all_Layers_idr_aligned_flag) that the video decoding apparatus 20 obtained from the bitstream is 1, and at least one of the pictures included in the same access unit is an RAP picture, the IRAP picture may be limited to being an IDR picture.

For example, when the bitstream includes a first layer image, a second layer image, and a third layer image, the value of the IDR alignment information (all_Layers_idr_aligned_flag) that the video decoding apparatus 20 obtained is 1, and a picture of the first layer image is an IRAP picture, the picture of the first layer image may be limited to being an IDR picture.

The video decoding apparatus 20 may obtain base layer encoded data from the bitstream. Also, the video decoding apparatus 20 may reconstruct a base layer image by using the obtained base layer encoded data and the obtained IDR alignment information (all_Layers_idr_aligned_flag).

The video decoding apparatus 20 may further obtain enhancement layer encoded data from the bitstream. The video decoding apparatus 20 may reconstruct the multilayer video image by using the obtained base layer encoded data, the obtained enhancement layer encoded data, the obtained IDR alignment information (all_Layers_idr_aligned_flag), or a combination thereof.

Figure 6:
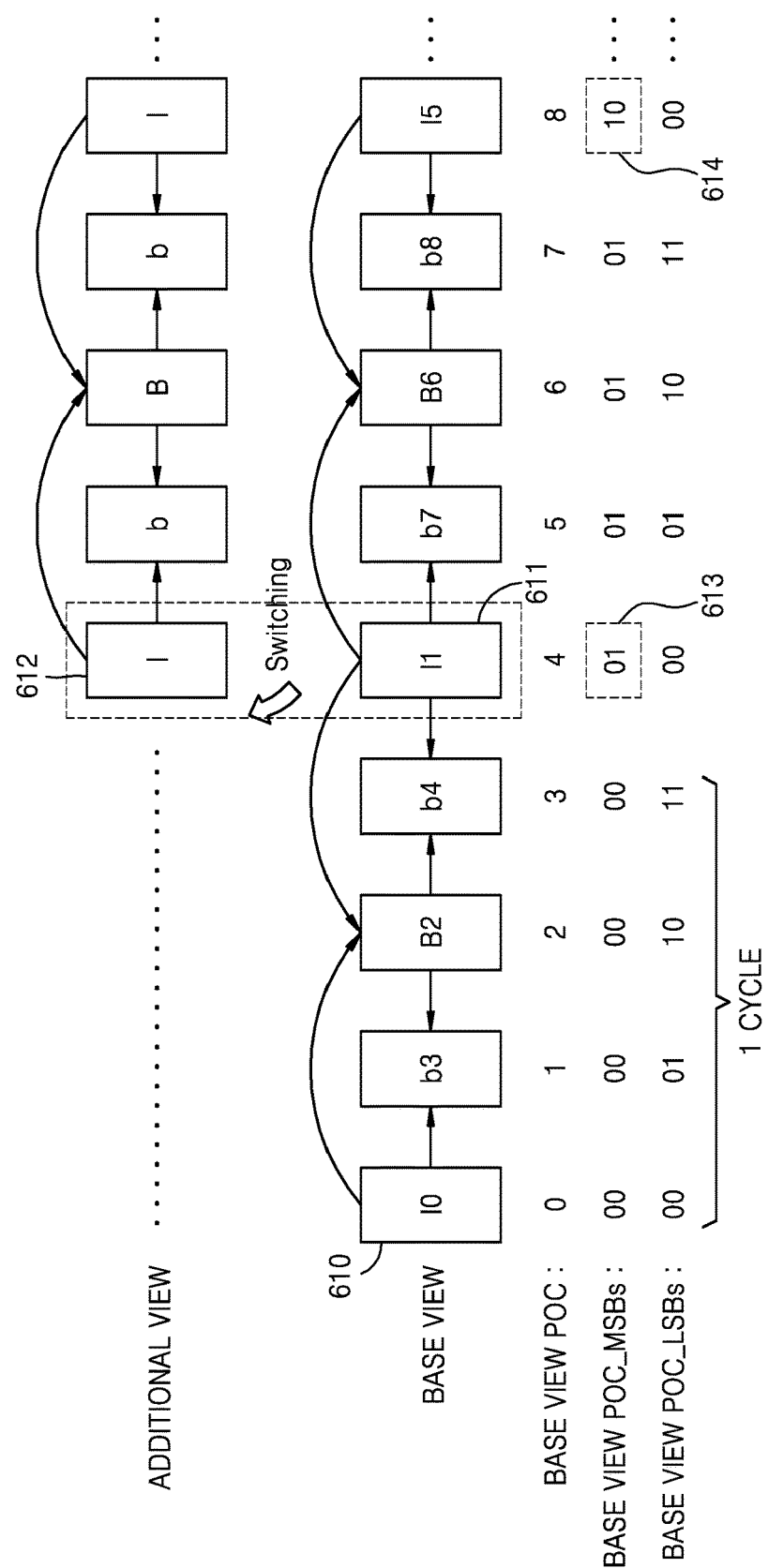
FIG. 6 illustrates an example of a relationship between picture order counts (POCs) of base view pictures included in a multiview video and base view POC_most significant bits (MSBs) and base view POC_least significant bits (LSBs) which are obtained by dividing the POCs of the base layer pictures.

FIG. 6 illustrates an example of a relationship between POCs of base view pictures included in a multiview video and base view POC_most significant bits (MSBs) and base view POC_LSBs which are obtained by dividing the POCs of the base layer pictures.

An IDR picture is a picture including only an I slice for refreshing a decoding apparatus when the picture is decoded. For example, when the IDR picture is decoded, a decoded picture buffer (DPB) marks a previously-decoded picture, excluding the IDR picture, as a picture that is unused for reference, and a picture order count (POC) is also initialized. Also, a picture decoded after the IDR picture may always follow the IDR picture in a display order and may be decoded without referring to a picture preceding the IDR picture.

A decoding order and an encoding order respectively refer to orders of processing pictures in the decoding apparatus and the encoding apparatus. Since the encoding apparatus sequentially encodes the pictures according to the picture input order and the decoding apparatus decodes the encoded pictures according to the picture receiving order, the encoding order and the decoding order with respect to the pictures are equal to each other.

Since a POC representing a display order of each picture with respect to the IDR picture is used to determine an output point of time of the decoded picture and to determine the reference picture set used for prediction-encoding each picture, POC information of each picture is important in video processing.

The POC is reset to 0 when the IDR picture is decoded, and pictures that are displayed until a next IDR picture after the IDR picture is decoded may each have a POC that increases by +1. A mode for signaling a POC may be an explicit mode. The explicit mode refers to a mode for dividing the POC into most significant bits (MSBs) including a predetermined number (m: an integer) of upper bits and least significant bits (LSBs) including a predetermined number (n: an integer) of lower bits and transmitting the LSBs as POC information of each picture. A decoder may acquire MSBs of a POC of a current picture based on MSBs and LSBs of a POC of a previous picture and received LSBs information regarding the POC of the current picture.

In FIG. 6, an arrow represents a reference direction. Also, I# refers to the (#)th decoded picture, and b# or B# refers to the (#)th decoded B picture that is bidirectionally predicted with reference to the reference picture according to the arrow. For example, the B2 picture is decoded by referring to the I0 picture and the I1 picture.

Referring to FIG. 6, the base view pictures are decoded in the order of I0, I1, B2, b3, b4, I5, B6, b7, and b8. According to POC values, the base view pictures are displayed in the order of I0, b3, B2, b4, I1, b7, B6, b9, and I5. POC information of each of the base view pictures should be signaled so as to determine the display order different from the decoding order. As described above, in the explicit mode, the POC may be divided into the MSBs including the upper bits and the LSBs including the lower bits, and only the LSBs corresponding to the lower bits may be transmitted as the POC information.

An I0 picture 610 is an IDR picture that is first decoded among the base view pictures. As described above, since the POC is reset to 0 when the IDR picture is decoded, the I0 picture 610 has a POC of 0. If the bit number of the LSBs of the POC is 2 bits, the LSBs of the POC of the base view pictures have a repeated pattern of "00 01 10 11" as illustrated. The MSBs of the POC increase by +1 when one cycle of "00 01 10 11" representable by the lower bits is completed. Even when receiving only the information of the LSBs of the POC, the decoding apparatus may acquire the MSBs of the POC of the base view pictures by increasing the value of the MSBs of the POC by +1 when one cycle of the displayed pictures is completed in the decoding process. Also, the decoding apparatus may reconstruct the POC of the picture by using the MSBs and LSBs. As an example, a process of reconstructing a POC of an I1 picture 611 will be described below. Information "00" of LSBs of the POC with respect to the I1 picture 611 is acquired through a predetermined data unit. Since a value of LSBs of a POC of a previous picture b4 displayed before the I1 picture 611 is "11" and the value of the LSBs of the POC of the I1 picture 611 is "00", "01" 613 may be acquired as a value of MSBs of the POC of the I1 picture 611 by increasing a value of MSBs of the POC of the previous picture b4 by +1. When the MSBs and the LSBs are acquired, a binary value "0100" corresponding to a POC value "4" of the I1 picture 611 through MSBs+LSBs may be acquired.

In this manner, only the LSBs information of the POC may be transmitted in a uni-view video without a big problem. However, when an inter-view random access or inter-view switching occurs in a multiview video, it may cause asynchronization of POCs of inter-view pictures. For example, a case where an I picture 612 that is an RAP picture corresponding to an additional view is reproduced since inter-view switching or a random access to an image corresponding to the additional view occurs while an image corresponding to the base view is reproduced is assumed. The decoding apparatus resets MSBs of a POC of the I picture 612 corresponding to the additional view, which is first decoded due to the random access, to "0". Thus, the POC of the I picture 611 corresponding to the base view has MSBs of "01" 613, while the POC of the I picture 612 corresponding to the additional view has the MSBs reset to "00" due to the random access. Accordingly, the I picture 611 corresponding to the base view and the I picture 612 corresponding to the additional view that are supposed to have the same POC may have different POCs, and there may be a difference between the display order of the image corresponding to the base view and the display order of the image corresponding to the additional view.

Thus, according to an embodiment, not only the LSBs information of the POC but also the MSBs information of the POC may be transmitted together with respect to the CRA picture and the BLA picture among the RAP pictures for synchronization of the pictures to be displayed simultaneously between the respective views even when inter-view random access or inter-view switching occurs in the multi-view video. In the case of an IDR picture, all of the MSBs and LSBs of the POC are reset to "0" to have a POC value of "0". Thus, the encoder may not separately transmit the POC information with respect to the IDR picture by setting all of the corresponding pictures of another layer as the IDR picture when the picture of any layer included in the same access unit corresponds to the IDR picture. When an inter-layer random access occurs and thus reproduction is performed from the IDR picture among the RAP pictures, since the POC values of the IDR pictures are reset to "0", the inter-layer IDR pictures may be synchronized because all of them have the same POC value.

FIG. 7 illustrates a diagram for describing a method of using IDR arrangement information, according to various embodiments of the present invention.

The video decoding apparatus 20 may acquire the IDR arrangement information from a bitstream. For example, the video decoding apparatus 20 may acquire a parameter (cross_layer_irap_aligned_idc) by reading data corresponding to u(2) from the bitstream.

The video decoding apparatus 20 may determine whether or not to obtain POC information regarding a current picture, based on a value of the IDR arrangement information. The POC information (slice_pic_order_cnt_lsb) may include LSBs information regarding the current picture.

For example, when the value of the IDR arrangement information is 1, and one of pictures included in a same access unit is an IDR picture, the video decoding apparatus 20 may not obtain the POC information (slice_pic_order_cnt_lsb) regarding the pictures included in the same access unit.

When the value of the IDR arrangement information is 0, even if a first picture from among the pictures included in the same access unit is the IDR picture, the video decoding apparatus 20 may obtain the POC information (slice_pic_order_cnt_lsb) regarding pictures that are included in the same access unit and are not the IDR picture.

For convenience of description, in FIGS. 4 through 7, only the operations performed by the video decoding apparatus 20 are illustrated and operations in the video encoding apparatus 10 are omitted. However, it will be obvious to one of ordinary skill in the art that the video encoding apparatus 10 may also perform the operations corresponding thereto.

The above video encoding and decoding methods performed by the video encoding and decoding apparatuses may also be used for inter-layer video encoding and decoding in inter-layer video encoding and decoding apparatuses.

The inter-layer video encoding apparatus according to various embodiments may classify and encode a plurality of image sequences on a layer-by-layer basis according to a scalable video coding scheme and may output a separate stream including data encoded on a layer-by-layer basis. The inter-layer video encoding apparatus may encode a first layer image sequence and a second layer image sequence to different layers.

A first layer encoder may encode first layer images, and may output a first layer stream including encoded data of the first layer images.

A second layer encoder may encode second layer images, and may output a second layer stream including encoded data of the second layer images.

For example, according to a scalable video coding scheme based on spatial scalability, low-resolution images may be encoded as the first layer images, and high-resolution images may be encoded as the second layer images. A result of encoding the first layer images may be output as the first layer stream, and a result of encoding the second layer images may be output as the second layer stream.

As another example, a multiview video may be encoded according to the scalable video coding scheme. Left-view images may be encoded as the first layer images, and right-view images may be encoded as the second layer images. Alternatively, center-view images, left-view images, and right-view images may be respectively encoded, wherein the center-view images may be encoded as the first layer images, the left-view images may be encoded as second layer images, and the right-view images may be encoded as third layer images.

As another example, a scalable video coding scheme may be performed according to temporal hierarchical prediction based on temporal scalability. The first layer stream including the encoded information generated by encoding images with a base frame rate may be output. A temporal layer (temporal level) may be classified with respect to each frame rate, and each temporal layer may be encoded as each layer. Images with a high frame rate may be further encoded by referring to the images with the base frame rate, and the second layer stream including the encoded information of the high frame rate may be output.

Also, scalable video coding may be performed on a first layer and a plurality of second layers. When there are at least three second layers, first layer images, first second layer images, second second layer images, . . . , and Kth second layer images may be encoded. Accordingly, the encoding result of the first layer images may be output as the first layer stream, and the encoding results of the first, second, . . . , and Kth second layer images may be output as first, second, . . . , and Kth second layer streams respectively.

The inter-layer video encoding apparatus according to various embodiments may perform inter prediction for predicting the current image by referring to images of a single layer. A motion vector representing motion information between the current image and a reference image and a residual component between the current image and the reference image may be generated through the inter prediction.

Also, the inter-layer video encoding apparatus may perform inter-layer prediction for predicting the second layer images by referring to the first layer images.

When the inter-layer video encoding apparatus according to an embodiment allows three or more layers such as a first layer, a second layer, a third layer, etc., inter-layer prediction may be performed between a first layer image and a third layer image and may be performed between a second layer image and the third layer image, according to a multi-layer prediction structure.

A position difference component between the current image and a reference image of another layer and a residual component between the current image and the reference image of the other layer may be generated through the inter-layer prediction.

The inter-layer video encoding apparatus according to various embodiments encodes each of blocks of each of images of a video, according to layers. A type of the block may be a square, a rectangle, or a random geometric shape. The block is not limited to a data unit of a constant size. The block may be a largest coding unit, a coding unit, a prediction unit, a transformation unit, etc. from among coding units of a tree structure. A largest coding unit including coding units of a tree structure may be variously called a coding tree unit, a coding block tree, a block tree, a root block tree, a coding tree, a coding root, or a tree trunk. Video encoding and decoding methods using the coding units according to a tree structure will be described with reference to FIGS. 8 through 20.

The inter prediction and the inter-layer prediction may be performed based on a data unit of the coding unit, the prediction unit, or the transformation unit.

In the video encoding apparatus according to an embodiment and the video decoding apparatus according to an embodiment, blocks of video data may be divided into coding units of a tree structure, and the coding units, the prediction units, and/or the transformation units may be used for inter prediction or inter-layer prediction with respect to the encoding units. Hereinafter, a video encoding method and apparatus and a video decoding method and apparatus based on transformation units and coding units of a tree structure according to an embodiment will be described with reference to FIGS. 8 through 20.

In principle, in an encoding/decoding process for a multilayer video, an encoding/decoding process for first layer images and an encoding/decoding process for second layer images are performed separately. That is, when an inter-layer prediction occurs in the multilayer video, the encoding/decoding results of the single-layer video may be cross-referenced, but a separate encoding/decoding process may occur in each single-layer video.

Thus, for convenience of description, since a video encoding process and a video decoding process based on coding units of a tree structure described below with reference to FIGS. 8 through 20 are a video encoding process and a video decoding process for a single-layer video, inter prediction and motion compensation will be described in detail.

Figure 8:
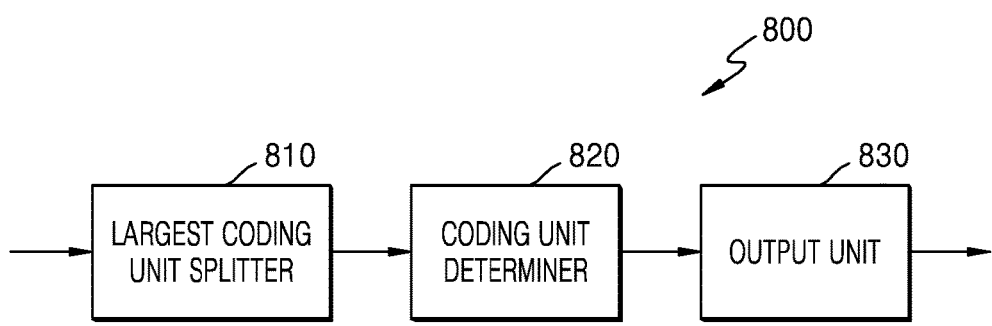
FIG. 8 illustrates a block diagram of a video encoding apparatus based on coding units of a tree structure, according to an embodiment.

Thus, in order for an encoder of an inter-layer video encoding apparatus according to an embodiment to encode a multilayer video based on the coding units of a tree structure, the encoder may include video encoding apparatuses 800 of FIG. 8 corresponding to the number of layers of the multilayer video so as to perform video encoding on each single-layer video, and may control each of the video encoding apparatuses 800 to perform encoding on a single-layer video allocated to each video encoding apparatus 800. Also, the inter-layer video encoding apparatus may perform inter-view prediction by using the separate single-view encoding results of each video encoding apparatus 800. Accordingly, the encoder of the inter-layer video encoding apparatus may generate a base view video stream and a second layer video stream including the encoding results on a layer-by-layer basis.

Figure 9:
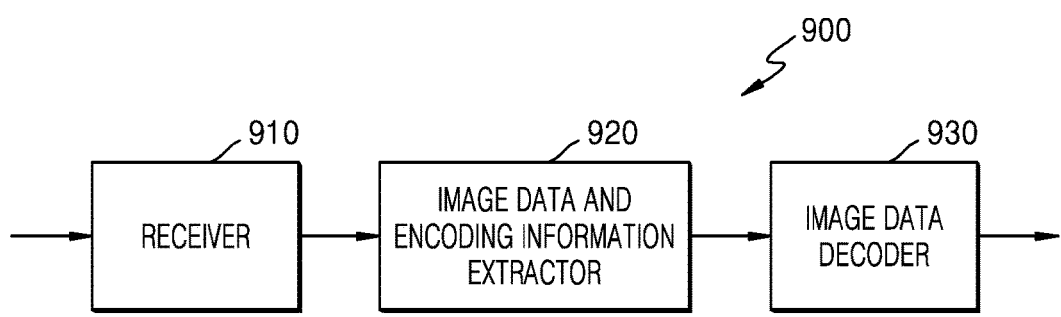
FIG. 9 illustrates a block diagram of a video decoding apparatus based on coding units of a tree structure, according to an embodiment.

Similarly, in order for a decoder of an inter-layer video decoding apparatus according to an embodiment to decode a multilayer video based on the coding units of a tree structure, the decoder may include video decoding apparatuses 900 of FIG. 9 corresponding to the number of layers of the multilayer video so as to perform video decoding on the received first layer video stream and second layer video stream on a layer-by-layer basis, and may control each of the video decoding apparatuses 900 to perform decoding on a single-layer video allocated to each of the video decoding apparatuses 900. Also, the inter-layer video decoding apparatus may perform inter-layer compensation by using the separate single-layer decoding results of each video decoding apparatus 900. Accordingly, the decoder of the inter-layer video decoding apparatus may generate first layer images and second layer images reconstructed on a layer-by-layer basis.

FIG. 8 illustrates a block diagram of a video encoding apparatus based on coding units of a tree structure 800, according to an embodiment of the present invention.

The video encoding apparatus involving video prediction based on coding units of the tree structure 800 includes a coding unit determiner 820 and an output unit 830. Hereinafter, for convenience of description, the video encoding apparatus involving video prediction based on coding units of the tree structure 800 is referred to as the 'video encoding apparatus 800'.

The coding unit determiner 820 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a finally encoded image data according to the at least one split region. That is, the coding unit determiner 820 determines a final depth by encoding the image data by using the deeper coding units according to depths, according to the largest coding unit of the current picture, and selecting a depth having the least encoding error. The determined final depth and image data according to largest coding units are output to the output unit 830.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one final depth may be selected for each largest coding unit.

The size of the largest coding unit is split because a coding unit is hierarchically split as a depth deepens, and the number of coding units increases. Also, even if coding units correspond to the same depth in one largest coding unit, it is determined whether to split each of the coding units into a lower depth by measuring an encoding error with respect to data of each of the coding units. Accordingly, even when data is included in one largest coding unit, the encoding errors according to depths may differ according to regions in the one largest coding unit, and thus the final depths may differ according to regions in the image data. Thus, one or more final depths may be set in one largest coding unit, and the data of the largest coding unit may be divided according to coding units of one or more final depths.

Accordingly, the coding unit determiner 820 according to an embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, 5 depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, has to be performed on all of the deeper coding units generated as the depth deepens. For convenience of description, the prediction encoding and the transformation will now be described based on a coding unit of a current depth, in at least one largest coding unit.

The video encoding apparatus 800 may variously select a size or shape of a data unit for encoding the image data. In order to encode the image data, operations, such as prediction encoding, transformation, and entropy encoding, are performed, and at this time, the same data unit may be used for all operations or a data unit may vary in each of the operations.

For example, the video encoding apparatus 800 may select not only a coding unit for encoding the image data, but may also select a data unit different from the coding unit so as to perform the prediction encoding on the image data of the coding unit.

In order to perform prediction encoding in the largest coding unit, the prediction encoding may be performed based on a coding unit corresponding to a final depth, i.e., based on a coding unit that is no longer split into coding units of a lower depth. Hereinafter, the coding unit that is no longer split and becomes a base unit for prediction encoding will now be referred to as a 'prediction unit'. A partition obtained by splitting the prediction unit may include a prediction unit and a data unit obtained by splitting at least one selected from a height and a width of the prediction unit. A partition may be a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode generating a least encoding error.

The video encoding apparatus 800 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 820 not only determines a depth having a least encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 820 may measure an encoding error of deeper coding units according to depths by using Rate-Distortion Optimization based on Lagrangian multipliers.

The output unit 830 outputs, in bitstreams, the image data of the largest coding unit, which is encoded based on the at least one depth determined by the coding unit determiner 820, and information according to depths.

The encoded image data may be obtained by encoding residual data of an image.

The information according to depths may include depth information, partition mode information about the prediction unit, prediction mode information, and transformation unit split information.

Final depth information may be defined by using split information according to depths, which indicates whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 830 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the prediction mode information and the partition size information. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information, prediction information, and slice type information that are related to prediction.

According to the simplest embodiment for the video encoding apparatus 800, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The inter-layer video encoding apparatus including the configuration described with reference to FIG. 1A may include the video encoding apparatuses 800 corresponding to the number of layers so as to encode single layer images in each of the layers of a multilayer video. For example, the first layer encoder may include one video encoding apparatus 800, and the second layer encoder may include the video encoding apparatuses 800 corresponding to the number of second layers.

When the video encoding apparatus 800 encodes first layer images, the coding unit determiner 820 may determine a prediction unit for inter-image prediction for each of coding units of a tree structure according to each largest coding unit, and may perform the inter-image prediction on each prediction unit.

When the video encoding apparatus 800 encodes the second layer images, the coding unit determiner 820 may determine prediction units and coding units of a tree structure according to each largest coding unit, and may perform inter-prediction on each of the prediction units.

The video encoding apparatus 800 may encode a luminance difference so as to compensate for the luminance difference between the first layer image and the second layer image. However, whether to perform luminance compensation may be determined according to an encoding mode of a coding unit. For example, the luminance compensation may be performed only on a prediction unit having a size of 2N×2N.

FIG. 9 illustrates a block diagram of a video decoding apparatus based on coding units of a tree structure 900, according to an embodiment.

The video decoding apparatus involving video prediction based on coding units of the tree structure 900 according to the embodiment includes a receiver 910, an image data and encoding information extractor 920, and an image data decoder 930. Hereinafter, for convenience of description, the video decoding apparatus involving video prediction based on coding units of the tree structure 900 according to the embodiment is referred to as the 'video decoding apparatus 900'.

Definitions of various terms, such as a coding unit, a depth, a prediction unit, a transformation unit, and various types of split information for decoding operations of the video decoding apparatus 900 according to the embodiment are identical to those described with reference to FIG. 8 and the video encoding apparatus 100.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information about the coding units having a tree structure according to each largest coding unit, from the parsed bitstream. The extracted final depth and the extracted split information are output to the image data decoder 930. That is, the image data in a bitstream is split into the largest coding unit so that the image data decoder 930 decodes the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 920 are a depth and split information determined to generate a minimum encoding error when an encoder, such as the video encoding apparatus 100, repeatedly performs encoding for each deeper coding unit according to depths according to each largest coding unit. Accordingly, the video decoding apparatus 900 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 920 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 930 reconstructs the current picture by decoding the image data in each largest coding unit based on the depth and the split information according to each of the largest coding units. That is, the image data decoder 930 may decode the encoded image data based on the read information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 930 may perform intra prediction or motion compensation according to a partition and a prediction mode of each coding unit, based on the information about the partition type and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each largest coding unit. Due to the inverse transformation, a pixel value of a spatial domain of the coding unit may be reconstructed.

The image data decoder 930 may determine a depth of a current largest coding unit by using split information according to depths. If the split information indicates that image data is no longer split in the current depth, the current depth is a depth. Accordingly, the image data decoder 930 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The inter-layer video decoding apparatus 20 described above with reference to FIG. 2A may include the video decoding apparatuses 900 corresponding to the number of views, so as to reconstruct first layer images and second layer images by decoding a received first layer image stream and a received second layer image stream.

When the first layer image stream is received, the image data decoder 930 of the video decoding apparatus 900 may split samples of the first layer images, which are extracted from the first layer image stream by an extractor 920, into coding units according to a tree structure of a largest coding unit. The image data decoder 930 may perform motion compensation, based on prediction units for the inter-image prediction, on each of the coding units according to the tree structure of the samples of the first layer images, and may reconstruct the first layer images.

When the second layer image stream is received, the image data decoder 930 of the video decoding apparatus 900 may split samples of the second layer images, which are extracted from the second layer image stream by the extractor 920, into coding units according to a tree structure of a largest coding unit. The image data decoder 930 may perform motion compensation, based on prediction units for the inter-image prediction, on each of the coding units of the samples of the second layer images, and may reconstruct the second layer images.

The extractor 920 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 900 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 10:
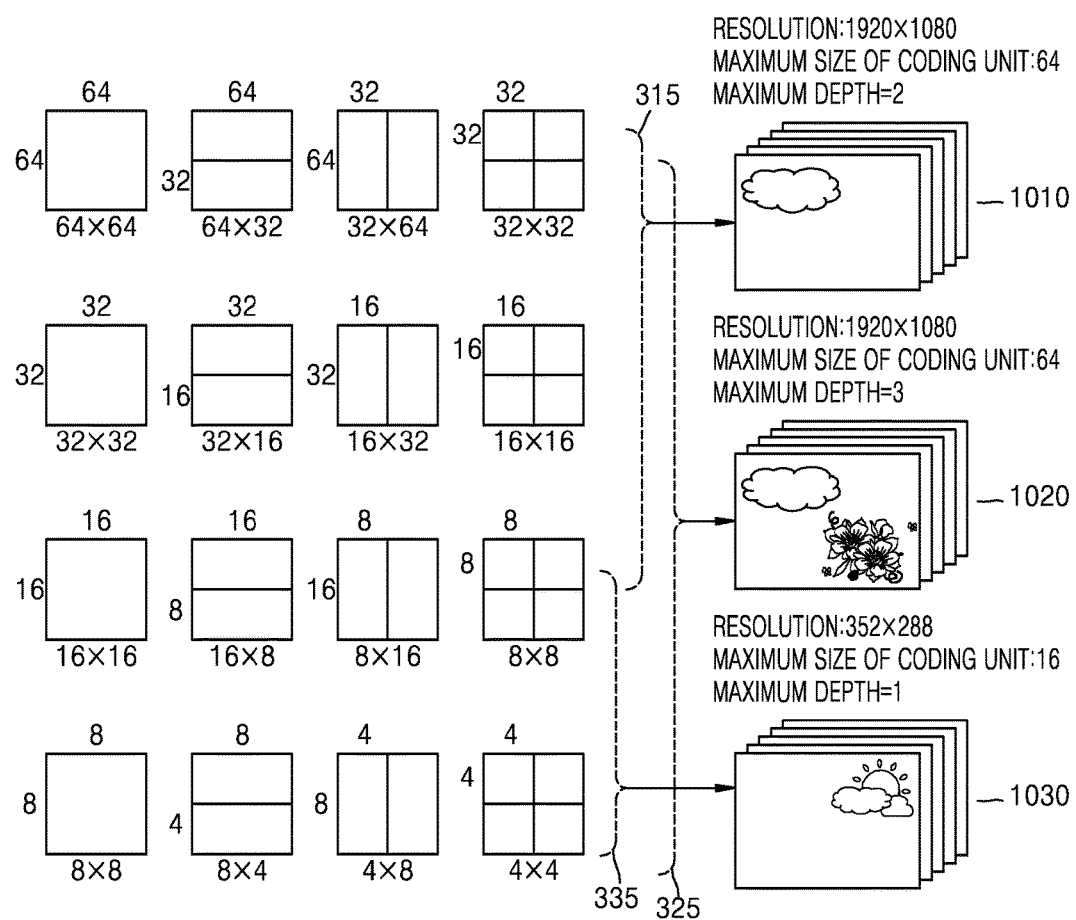
FIG. 10 illustrates a concept of coding units, according to an embodiment of the present invention.

FIG. 10 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes the total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 1030 may be 64.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
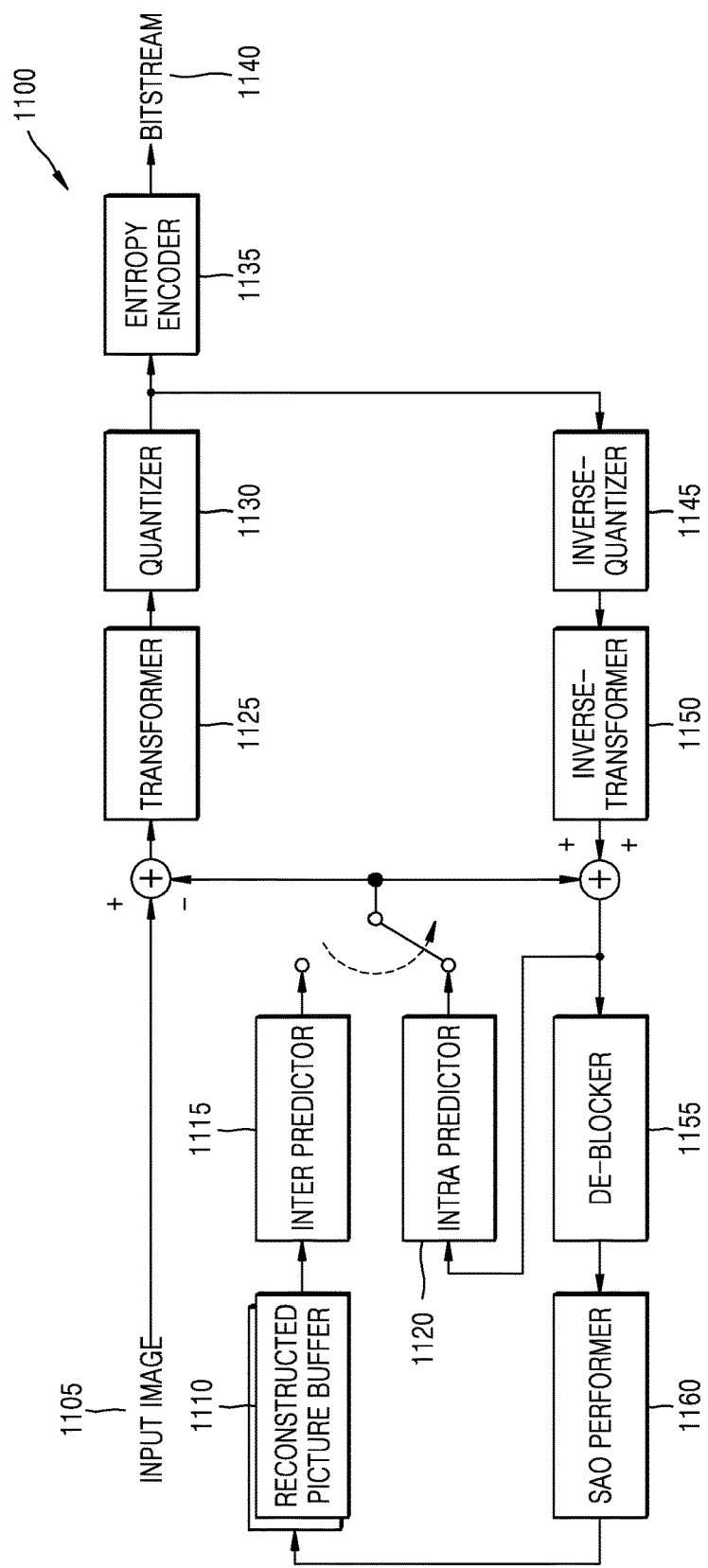
FIG. 11 illustrates a block diagram of a video encoder based on coding units, according to an embodiment of the present invention.

FIG. 11 illustrates a block diagram of an image encoder 1100 based on coding units, according to various embodiments.

The video encoder 1100 according to the embodiment performs operations necessary for encoding image data in a picture encoder 1520 of the video encoding apparatus 800. That is, an intra predictor 1120 performs intra prediction on coding units in an intra mode according to prediction units, from among a current image 1105, and an inter predictor 1115 performs inter prediction on coding units in an inter mode by using the current image 1105 and a reference image obtained from a reconstructed picture buffer 1110 according to prediction units. The current image 1105 may be split into largest coding units and then the largest coding units may be sequentially encoded. In this regard, encoding may be performed on coding units of a tree structure which are split from the largest coding unit.

Residue data is generated by removing prediction data regarding coding units of each mode that is output from the intra predictor 1120 or the inter predictor 1115 from data regarding encoded coding units of the current image 1105, and the residue data is output as a quantized transformation coefficient according to transformation units via a transformer 1125 and a quantizer 1130. The quantized transformation coefficient is reconstructed as the residue data in a spatial domain via an inverse-quantizer 1145 and an inverse-transformer 1150. The reconstructed residue data in the spatial domain is added to prediction data for coding units of each mode that is output from the intra predictor 1120 or the inter predictor 1115 and thus is reconstructed as data in a spatial domain for coding units of the current image 1105. The reconstructed data in the spatial domain is generated as reconstructed images via a de-blocker 1155 and an SAO performer 1160. The reconstructed images are stored in the reconstructed picture buffer 1110. The reconstructed images stored in the reconstructed picture buffer 1110 may be used as reference images for inter prediction of another image. The transformation coefficient quantized by the transformer 1125 and the quantizer 1130 may be output as a bitstream 1140 via an entropy encoder 1135.

In order for the video encoder 1100 to be applied in the video encoding apparatus 800, all elements of the video encoder 1100, i.e., the inter predictor 1115, the intra predictor 1120, the transformer 1125, the quantizer 1130, the entropy encoder 1135, the inverse-quantizer 1145, the inverse-transformer 1150, the de-blocker 1155, and the SAO performer 1160, perform operations based on each coding unit among coding units having a tree structure according to each largest coding unit.

In particular, the intra predictor 1120 and the inter predictor 1115 may determine a partition mode and a prediction mode of each coding unit from among the coding units having a tree structure by taking into account a maximum size and a maximum depth of a current largest coding unit, and the transformer 1125 may determine whether to split a transformation unit having a quadtree structure in each coding unit from among the coding units having a tree structure.

Figure 12:
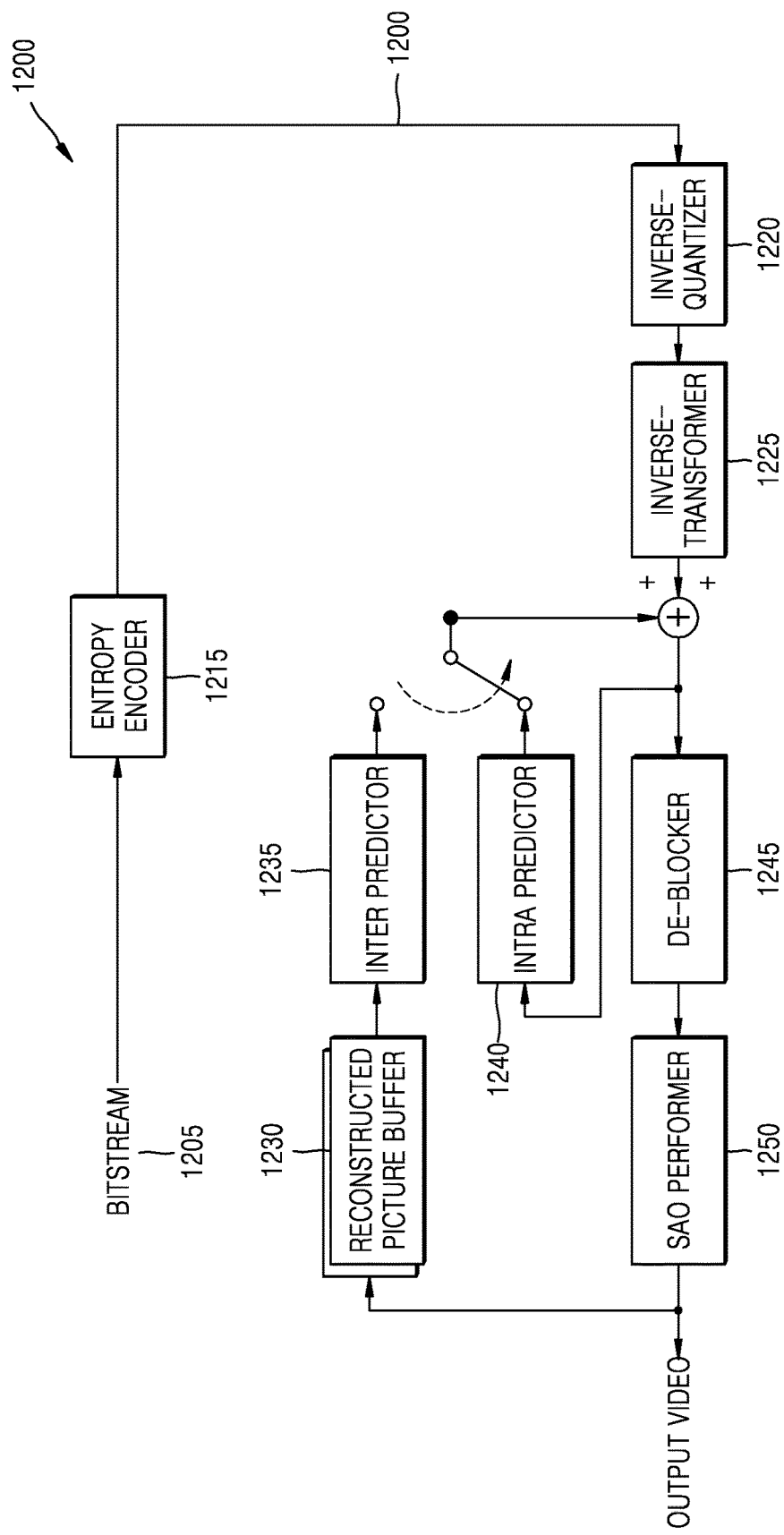
FIG. 12 illustrates a block diagram of a video decoder based on coding units, according to an embodiment of the present invention.

FIG. 12 illustrates a block diagram of a video decoder 1200 based on coding units, according to various embodiments.

An entropy decoder 1215 parses decoding-target encoded image data and encoding information required for decoding from a bitstream 1205. The encoded image data is a quantized transformation coefficient, and an inverse-quantizer 1220 and an inverse-transformer 1225 reconstructs residue data from the quantized transformation coefficient.

An intra predictor 1240 performs intra prediction on coding units in an intra mode according to each prediction unit. An inter predictor 1235 performs inter prediction on coding units in an inter mode from among the current image for each prediction unit by using a reference image obtained from a reconstructed picture buffer 1230.

Prediction data and residue data regarding coding units of each mode which passed through the intra predictor 1240 or the inter predictor 1235 are summed, and thus data in a spatial domain regarding coding units of the current image 1105 may be reconstructed, and the reconstructed data in the spatial domain may be output as a reconstructed image 1260 via a de-blocker 1245 and an SAO performer 1250. Reconstructed images stored in the reconstructed picture buffer 1230 may be output as reference images.

In order to decode the image data in a picture decoder 930 of the video decoding apparatus 900, operations after the entropy decoder 1215 of the video decoder 1200 according to an embodiment may be performed.

In order for the video decoder 1200 to be applied in the video decoding apparatus 900 according to an embodiment, all elements of the video decoder 1200, i.e., the entropy decoder 1215, the inverse-quantizer 1220, the inverse-transformer 1225, the inter predictor 1240, the inter predictor 1235, the de-blocker 1245, and the SAO performer 1250 may perform operations based on coding units having a tree structure for each largest coding unit.

In particular, the inter predictor 1240 and the inter predictor 1235 may determine a partition mode and a prediction mode for each of the coding units having a tree structure, and the inverse-transformer 1225 may determine whether to split a transformation unit according to a quadtree structure for each of the coding units.

The encoding operation of FIG. 10 and the decoding operation of FIG. 11 describe each of videostream encoding and decoding operations in a single layer, respectively. Thus, if the encoder of FIG. 1A encodes a videostream of two or more layers, the image encoder 1100 may be provided for each layer. Similarly, if the decoder 26 of FIG. 2A decodes a videostream of two or more layers, the image decoder 1200 may be provided for each layer.

Figure 13:
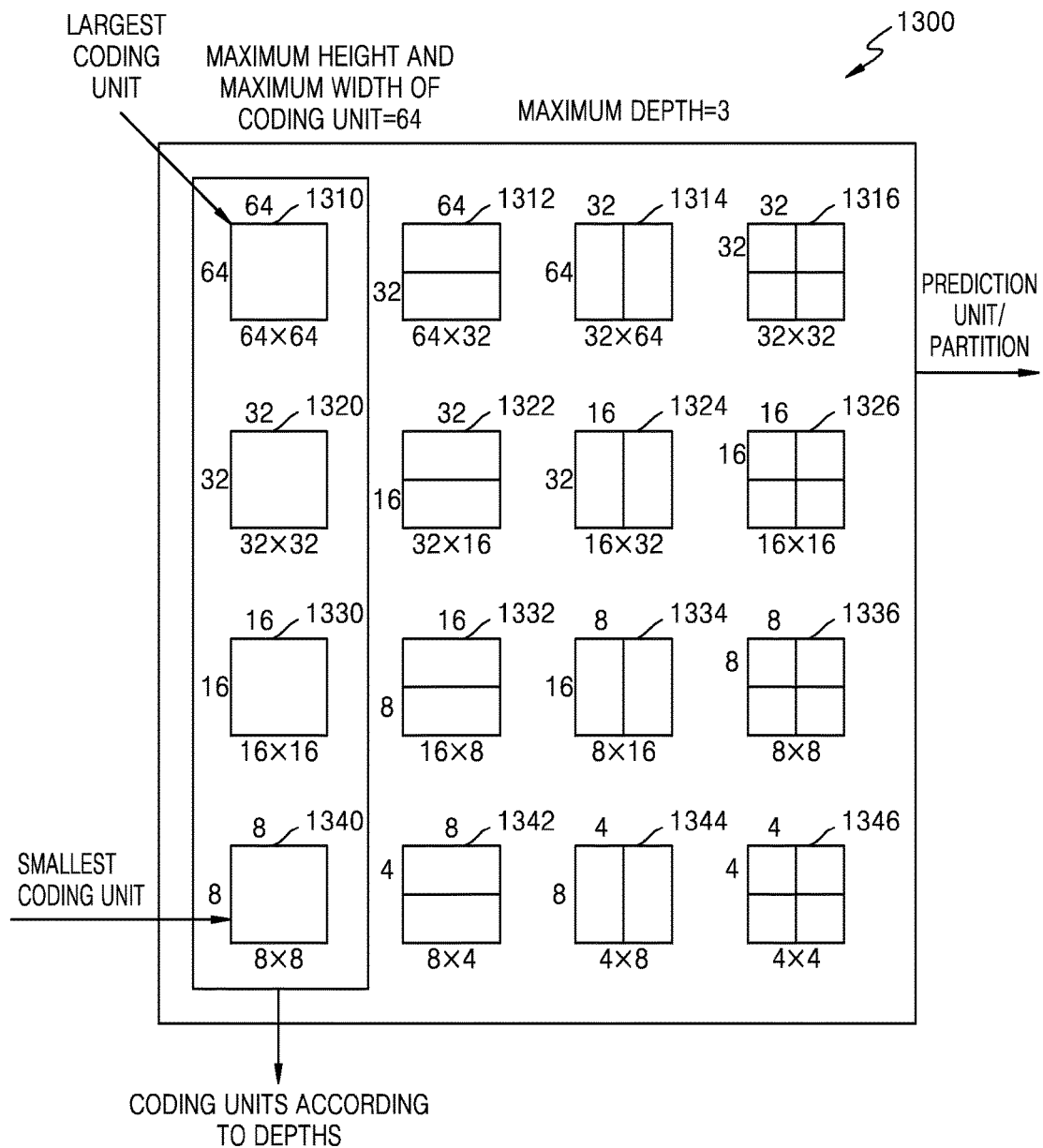
FIG. 13 illustrates coding units and partitions, according to an embodiment of the present invention.

FIG. 13 illustrates a diagram illustrating deeper coding units according to depths, and partitions, according to various embodiments.

The video encoding apparatus 800 and the video decoding apparatus 900 use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1300 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 1300, a height and a width of the deeper coding unit are each split. Also, a prediction unit and partitions, which are bases for prediction encoding of each deeper coding unit, are shown along a horizontal axis of the hierarchical structure of coding units 1300.

That is, a coding unit 1310 is a largest coding unit in the hierarchical structure of coding units 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having the size of 8×8 and the depth of 3 is a smallest coding unit.

The prediction unit and the partitions of a coding unit are arranged along the horizontal axis according to each depth. In other words, if the coding unit 1310 having a size of 64×64 and a depth of 0 is a prediction unit, the prediction unit may be split into partitions included in the coding unit 1310 having the size of 64×64, i.e. a partition 1310 having a size of 64×64, partitions 1312 having the size of 64×32, partitions 1314 having the size of 32×64, or partitions 1316 having the size of 32×32.

Equally, a prediction unit of the coding unit 1320 having the size of 32×32 and the depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Equally, a prediction unit of the coding unit 1330 having the size of 16×16 and the depth of 2 may be split into partitions included in the coding unit 1330 having the size of 16×16, i.e. a partition 1330 having a size of 16×16 included in the coding unit 1330, partitions 1332 having a size of 16×8, partitions 1334 having a size of 8×16, and partitions 1336 having a size of 8×8.

Equally, a prediction unit of the coding unit 1340 having the size of 8×8 and the depth of 3 may be split into partitions included in the coding unit 1340 having the size of 8×8, i.e. a partition 1340 having a size of 8×8 included in the coding unit 1340, partitions 1342 having a size of 8×4, partitions 1344 having a size of 4×8, and partitions 1346 having a size of 4×4.

In order to determine a depth of the largest coding unit 1310, the coding unit determiner 820 of the video encoding apparatus 800 has to perform encoding on coding units respectively corresponding to depths included in the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1300. Alternatively, the minimum encoding error may be searched for by comparing representative encoding errors according to depths, by performing encoding for each depth as the depth deepens along the vertical axis of the hierarchical structure of coding units 1300. A depth and a partition generating the minimum encoding error in the largest coding unit 1310 may be selected as a depth and a partition mode of the largest coding unit 1310.

Figure 14:
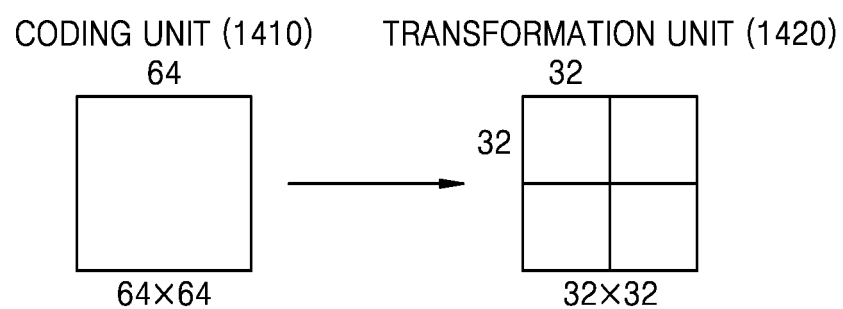
FIG. 14 illustrates a relationship between a coding unit and transformation units, according to an embodiment of the present invention.

FIG. 14 illustrates a relationship between a coding unit and transformation units, according to various embodiments.

The video encoding apparatus 800 or the video decoding apparatus 900 encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 800 according to an embodiment or the video decoding apparatus 900 according to an embodiment, when a size of the coding unit 1410 is 64×64, transformation may be performed by using the transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 15:
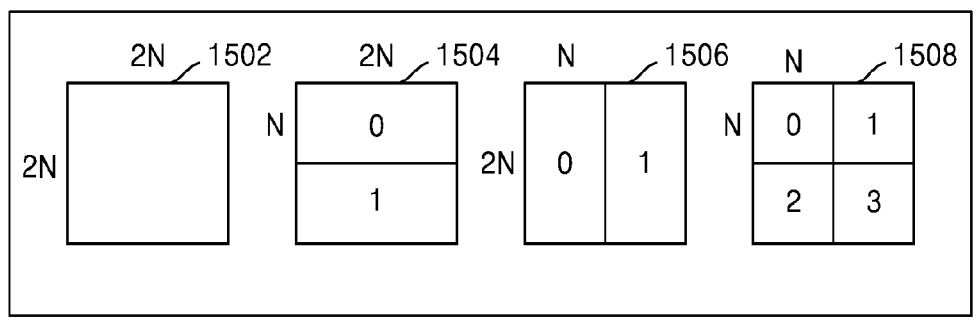
FIG. 15 illustrates a plurality of pieces of encoding information, according to an embodiment of the present invention.
Figure 15:
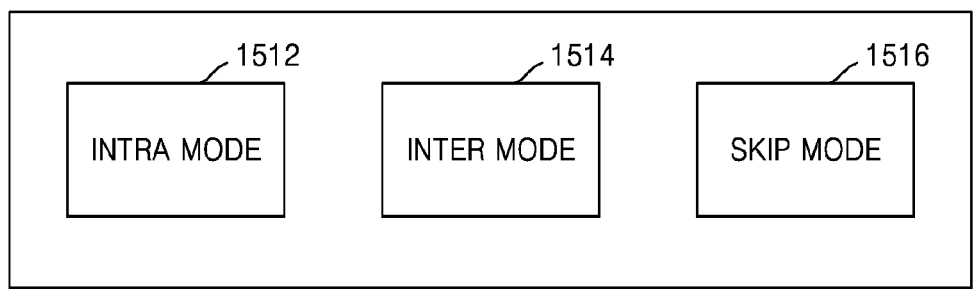
Figure 15:
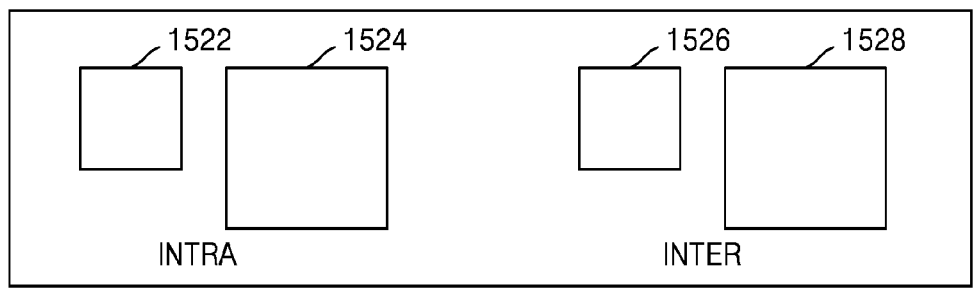

FIG. 15 illustrates a plurality of pieces of encoding information, according to various embodiments.

The output unit 830 of the video encoding apparatus 800 may encode and transmit, as split information, partition mode information 1500, prediction mode information 1510, and transformation unit size information 1520 for each coding unit corresponding to a depth.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. In this case, the partition mode information 1500 about a current coding unit is set to indicate one of the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transformation unit size information 1520 indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The image data and encoding information extractor 1610 of the video decoding apparatus 900 may extract and use the partition mode information 1500, the prediction mode information 1510, and the transformation unit size information 1520 for decoding, according to each deeper coding unit.

Figure 16:
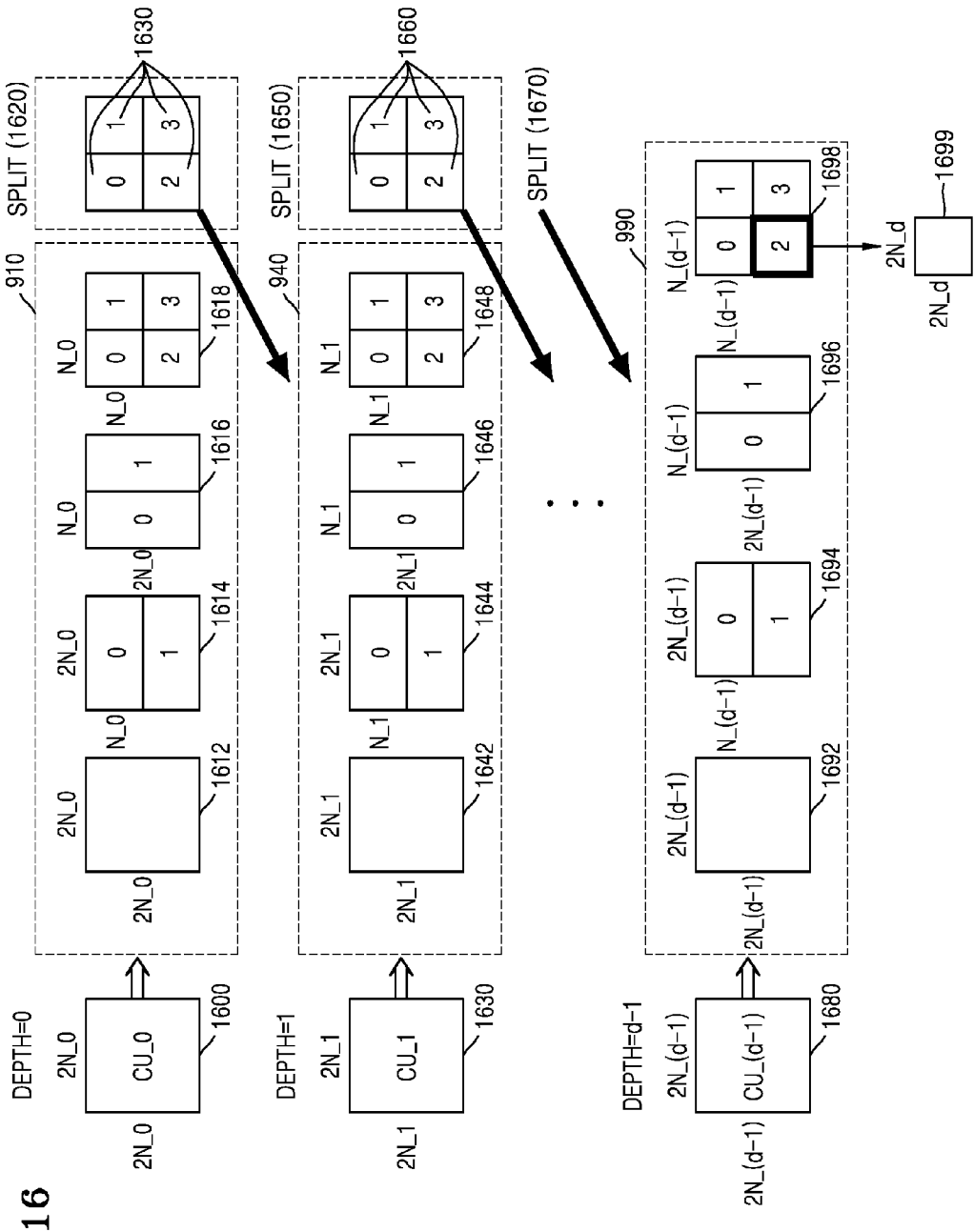
FIG. 16 illustrates coding units, according to an embodiment of the present invention.

FIG. 16 illustrates deeper coding units according to depths, according to various embodiments.

Split information may be used to indicate a change in a depth. The spilt information indicates whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. Only the partition modes 1612, 1614, 1616, and 1618 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 1612, 1614, and 1616 having the sizes of 2N_0×2N_0, 2N_0×N_0 and N_0×2N_0, the prediction unit 1610 may not be split into a lower depth.

If the encoding error is the smallest in the partition mode 1618 having the size of N_0×N_0, a depth is changed from 0 to 1 and split is performed (operation 920), and encoding may be repeatedly performed on coding units 1630 of a partition mode having a depth of 2 and a size of N_0×N_0 so as to search for a minimum encoding error.

A prediction unit 1630 for prediction encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648 having the size of N_1×N_1, a depth is changed from 1 to 2 and split is performed (in operation 950), and encoding may be repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. In other words, when encoding is performed up to when the depth is d−1 after a coding unit corresponding to a depth of d−2 is split (in operation 970), a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode having a minimum encoding error.

Even when the partition type 1698 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for the coding unit 1652 corresponding to a depth of d−1 is not set.

A data unit 1699 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 800 according to the embodiment may select a depth having the least encoding error by comparing encoding errors according to depths of the coding unit 1600 to determine a depth, and set a corresponding partition type and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 920 of the video decoding apparatus 900 according to the embodiment may extract and use a depth and prediction unit information about the coding unit 1600 so as to decode the coding unit 1612. The video decoding apparatus 900 according to the embodiment may determine a depth, in which split information is '0', as a depth by using split information according to depths, and may use, for decoding, split information about the corresponding depth.

Figure 17:
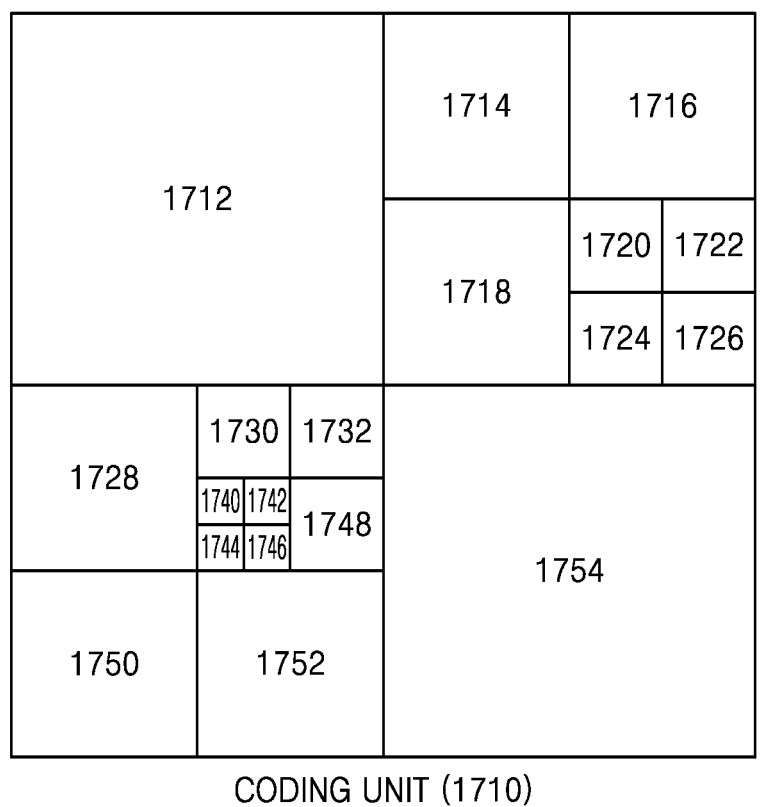
FIGS. 17, 18, and 19 illustrate relationship between coding units, prediction units, and transformation units, according to embodiments of the present invention.
Figure 18:
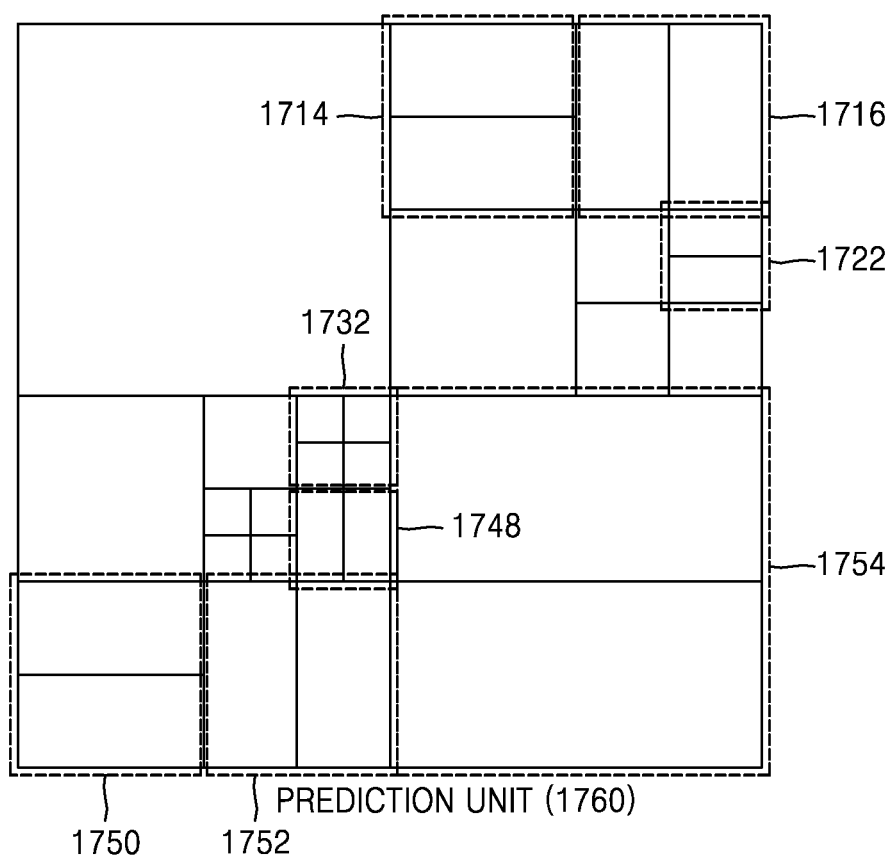
Figure 19:
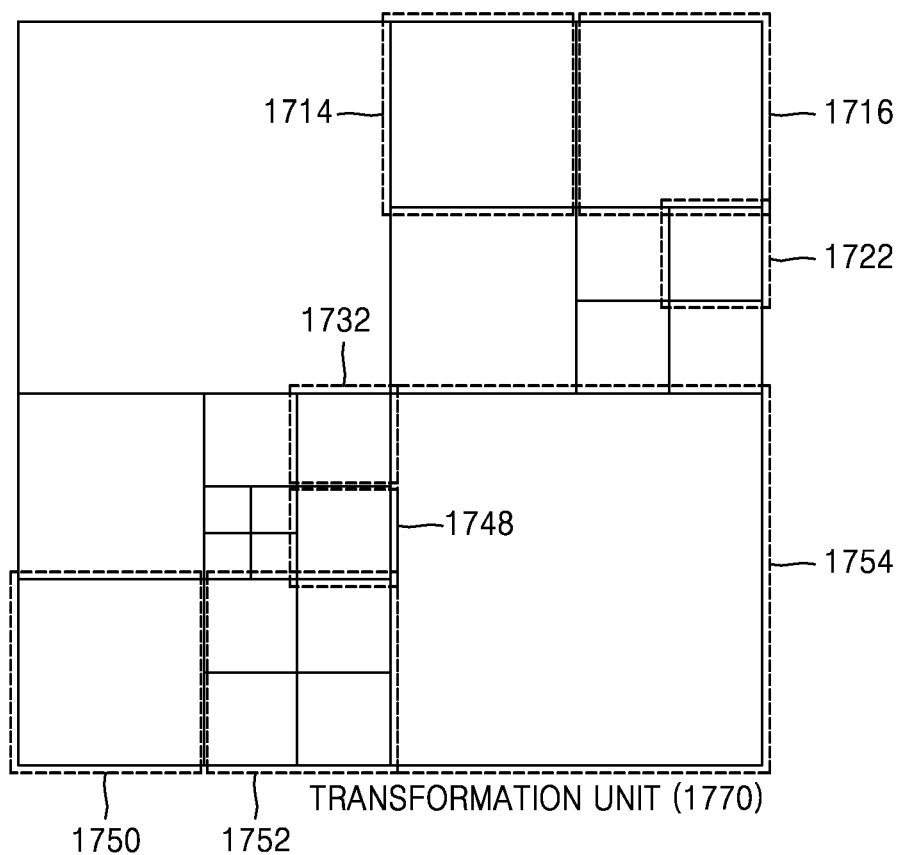

FIGS. 17, 18, and 19 illustrate a relationship between coding units, prediction units, and transformation units, according to various embodiments.

Coding units 1710 are deeper coding units according to depths determined by the video encoding apparatus 800, in a largest coding unit. Prediction units 1760 are partitions of prediction units of each of the coding units 1710 according to depths, and transformation units 1770 are transformation units of each of the coding units according to depths.

When a depth of a largest coding unit is 0 in the deeper coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

Some partitions 1714, 1716, 1722, 1732, 1748, 1750, 1752, and 1754 from among the prediction units 1760 are obtained by splitting the coding unit. That is, partitions 1714, 1722, 1750, and 1754 are a partition mode having a size of 2N×N, partitions 1716, 1748, and 1752 are a partition mode having a size of N×2N, and a partition 1732 is a partition mode having a size of N×N. Prediction units and partitions of the deeper coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1760 are data units different from those in the prediction units 1760 in terms of sizes and shapes. That is, the video encoding apparatus 800 and the video decoding apparatus 900 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, partition mode information, prediction mode information, and transformation unit size information. Table 1 below shows the encoding information that may be set by the video encoding apparatus 800 and the video decoding apparatus 900 according to the embodiments.

TABLE 1

Split Information 0
(Encoding on Coding Unit having Size of 2N × 2N and Current Depth of d)

| | | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 | Repeatedly Encode Coding Units having |

TABLE 1-continued

Split Information 0
(Encoding on Coding Unit having Size of 2N × 2N and Current Depth of d)

| | | | Size of Transformation Unit | | |
|---|---|---|---|---|---|
| Prediction Mode | Partition Type | | Split Information 0 of Transformation Unit | Split Information 1 of Transformation Unit | Split Information 1 |
| | Symmetrical Partition Type | Asymmetrical Partition Type | | | |
| | | | | (Asymmetrical Partition Type) | Lower Depth of d + 1 |

The output unit 830 of the video encoding apparatus 800 according to the embodiment may output the encoding information about the coding units having a tree structure, and the image data and encoding information extractor 920 of the video decoding apparatus 900 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 20:
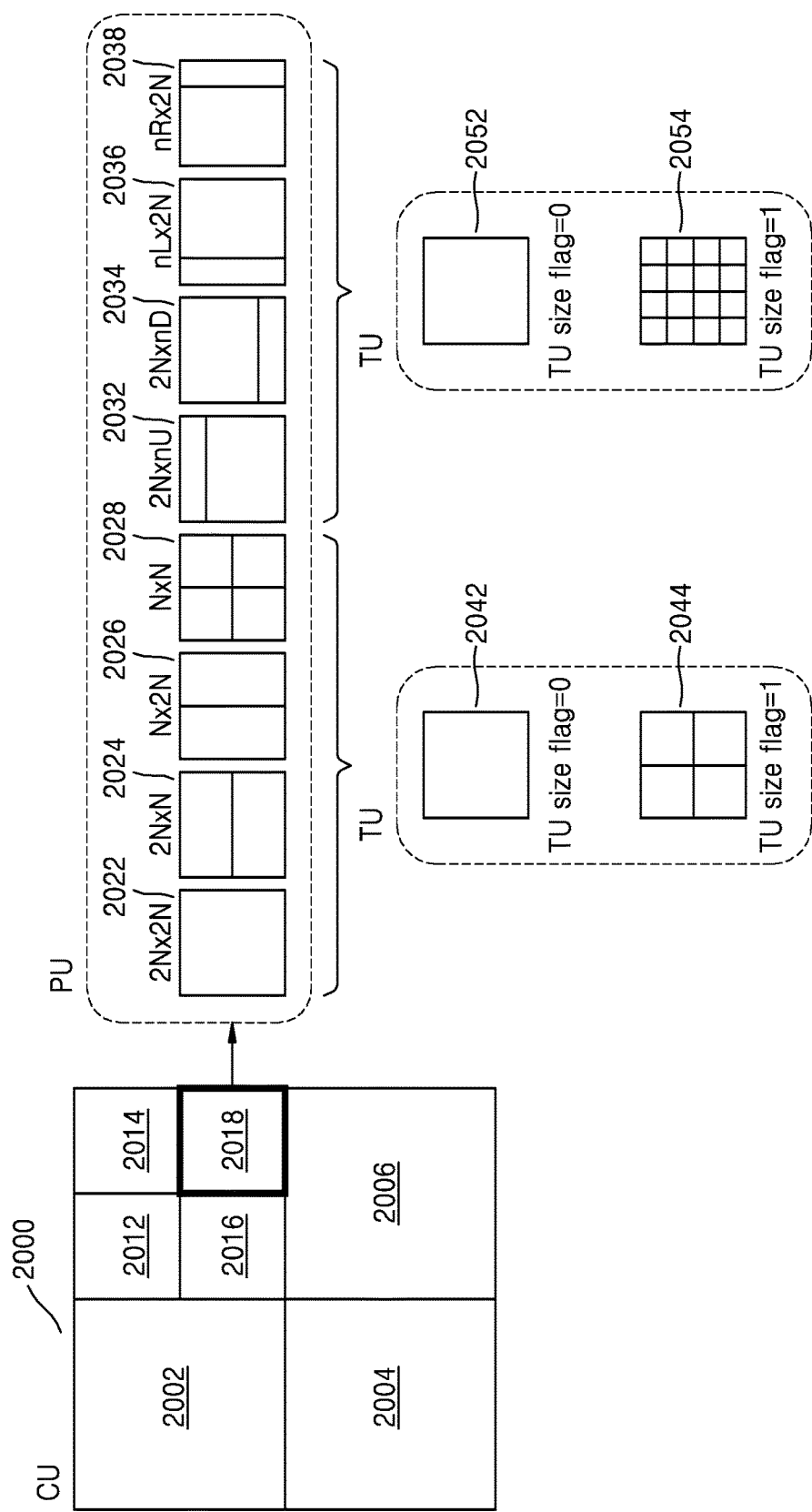
FIG. 20 illustrates a relationship between a coding unit, a prediction unit, and a transformation unit, according to encoding mode information of Table 2.

FIG. 20 illustrates a relationship between a coding unit, a prediction unit, and a transformation unit, according to encoding mode information of Table 2.

A largest coding unit 2000 includes coding units 2002, 2004, 2006, 2012, 2014, 2016, and 2018 of depths. Here, since the coding unit 2018 is a coding unit of a depth, split information may be set to 0. Partition mode information of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N may be set.

When the partition mode information is set to be one of asymmetrical partition modes 2N×nU 2032, 2N×nD 2034, nL×2N 2036, and nR×2N 2038, if the transformation unit split information (TU size flag) is 0, a transformation unit 2052 having a size of 2N×2N may be set, and if the transformation unit split information is 1, a transformation unit 2054 having a size of N/2×N/2 may be set.

The transformation unit split information (TU size flag) described above with reference to FIG. 19 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 800 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 900 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize},\text{RootTuSize}/(2^{\text{MaxTransformSizeIndex}})) \qquad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \qquad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \qquad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the video encoding methods and/or the video encoding method, which are described with reference to FIGS. 1A through 20, will be collectively referred to as 'the video encoding method'. Also, the video decoding methods and/or the video decoding method, which are described with reference to FIGS. 1A through 20, will be collectively referred to as 'the video decoding method'.

Also, a video encoding apparatus including the video encoding apparatus, the video encoding apparatus 800, or the video encoder 1100 which are described with reference to FIGS. 1A through 20 will be collectively referred as a 'video encoding apparatus'. Also, a video decoding apparatus including the inter-layer video decoding apparatus, the video decoding apparatus 900, or the video decoder 1200 which are described with reference to FIGS. 1A through 20 will be collectively referred to as a 'video decoding apparatus'.

The computer-readable recording medium such as a disc 26000 that stores the programs according to an embodiment will now be described in detail.

Figure 21:
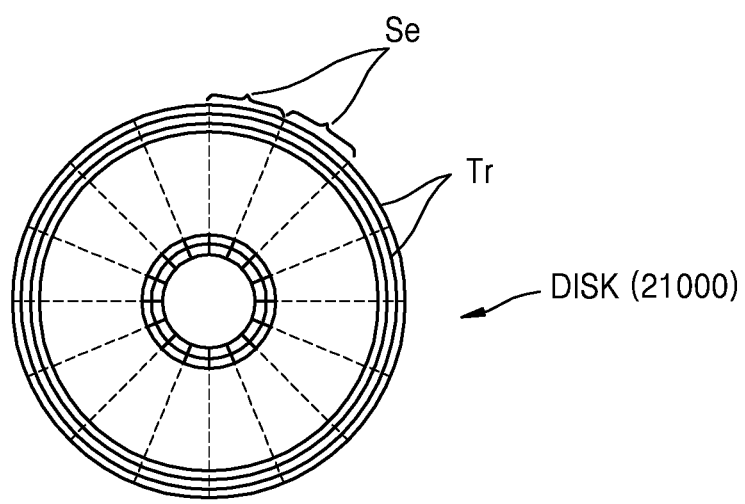
FIG. 21 illustrates a physical structure of a disc in which a program is stored, according to an embodiment.

FIG. 21 illustrates a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
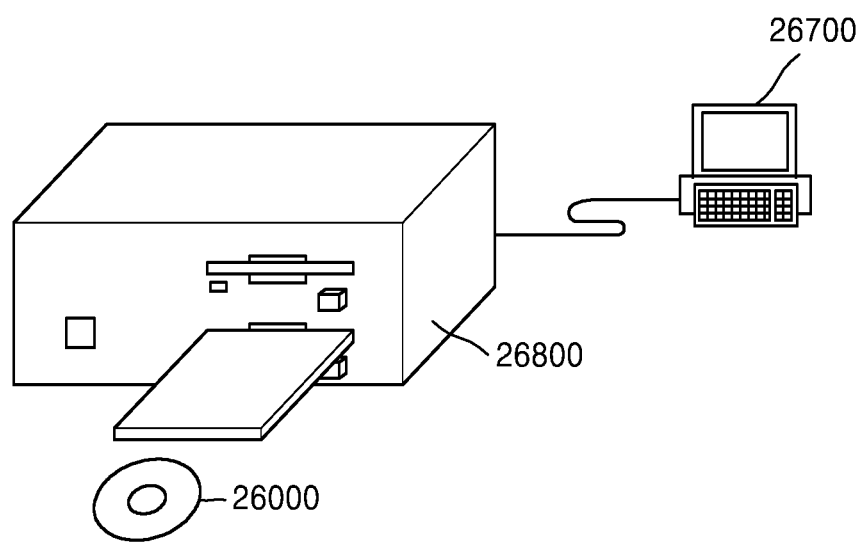
FIG. 22 illustrates a disc drive for recording and reading a program by using the disc.

FIG. 22 illustrates a diagram of a disc drive 26800 for recording and reading a program by using the disc 26000. A computer system 26700 may store a program that executes at least one selected from a video encoding method and a video decoding method according to an embodiment, in the disc 26000 via the disc drive 26800. In order to run the program stored in the disc 26000 in the computer system 26700, the program may be read from the disc 26000 and be transmitted to the computer system 26700 by using the disc drive 26800.

The program that executes at least one of a video encoding method and a video decoding method according to an embodiment may be stored not only in the disc 26000 illustrated in FIGS. 21 and 22 but also may be stored in a memory card, a ROM cassette, or a solid state drive (SSD).

A system to which the video encoding method and the video decoding method described above are applied will be described below.

Figure 23:
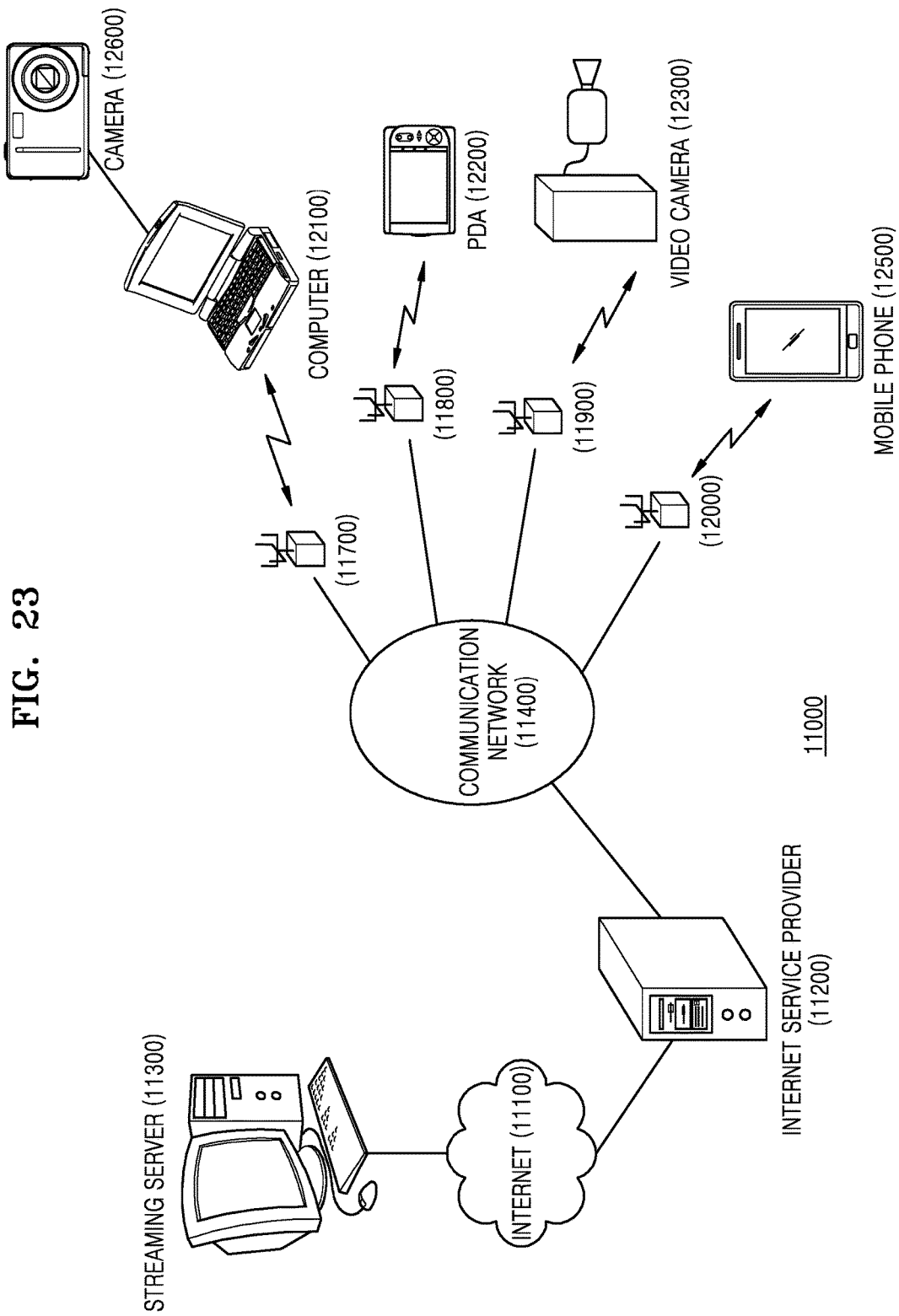
FIG. 23 illustrates an overall structure of a content supply system for providing a content distribution service.

FIG. 23 illustrates a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
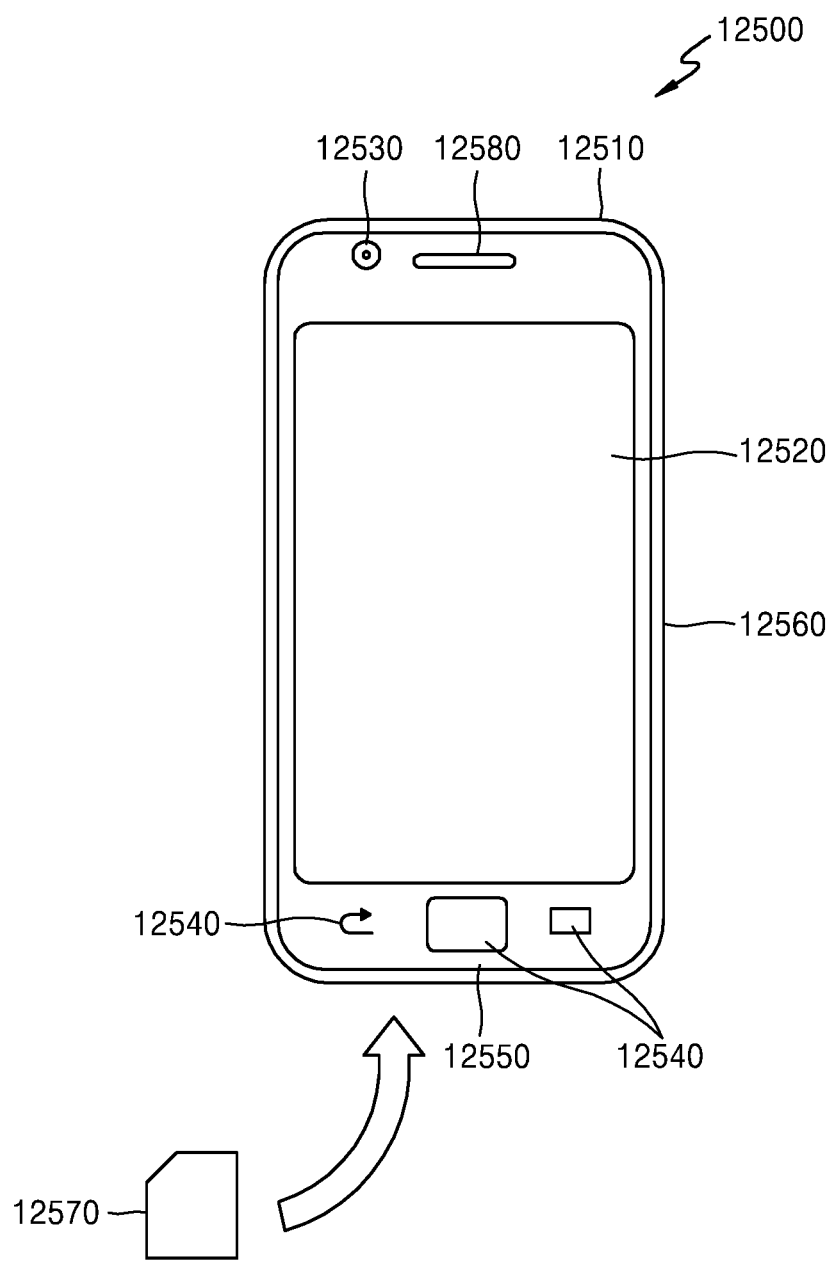
FIGS. 24 and 25 illustrate external and internal structures of a mobile phone to which a video encoding method and a video decoding method are applied, according to embodiments.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to embodiments.

Figure 25:
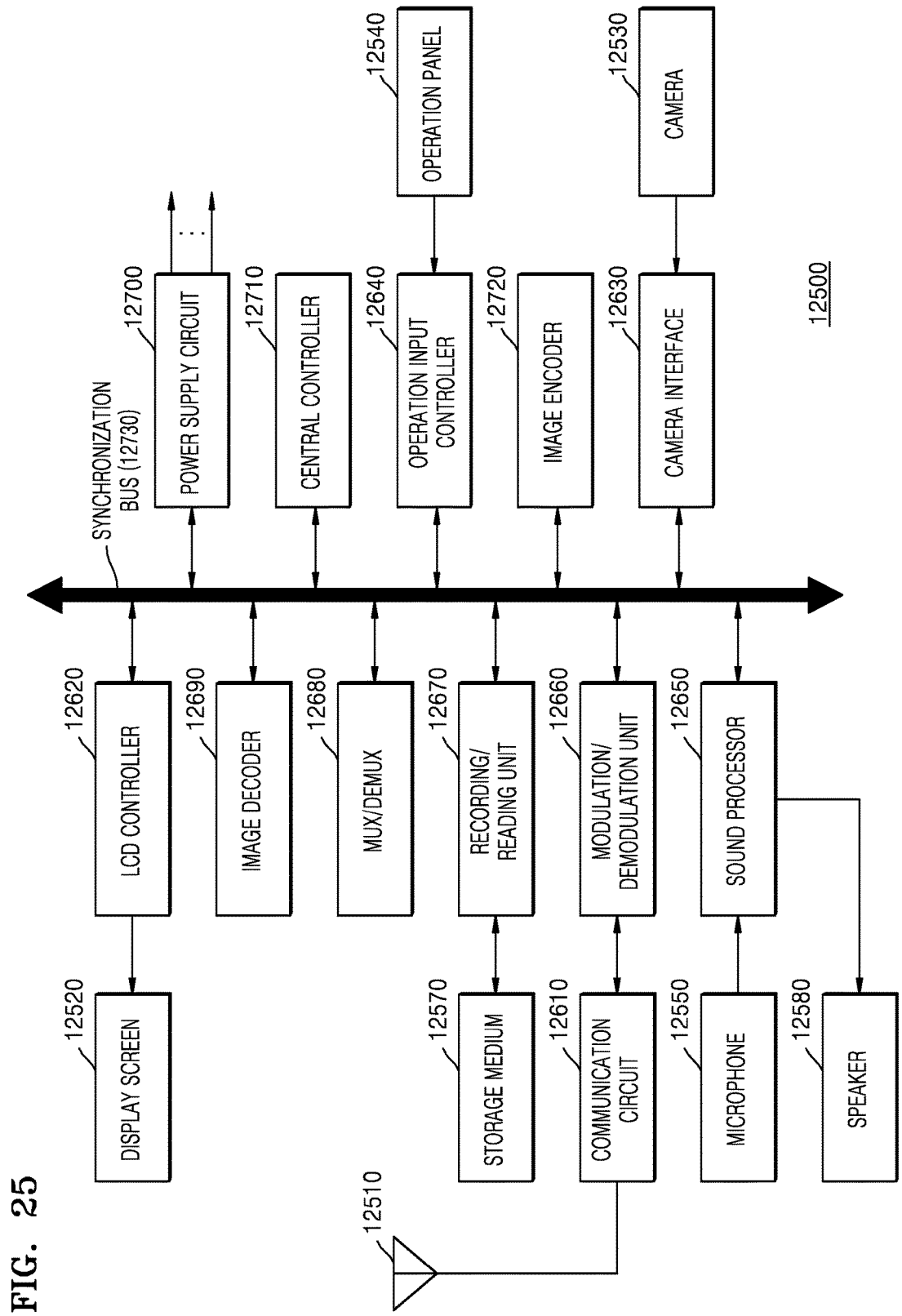

With reference to FIGS. 24 and 25, the mobile phone 12500 included in the content supply system 11000 according to an embodiment will now be described in detail.

FIG. 24 illustrates an external structure of the mobile phone 12500 to which the video encoding method and the video decoding method are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the video encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (D/A) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (A/D) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and A/D on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus according to an exemplary embodiment, may be a transmitting terminal including only the video encoding apparatus, or may be a receiving terminal including only the video decoding apparatus.

Figure 26:
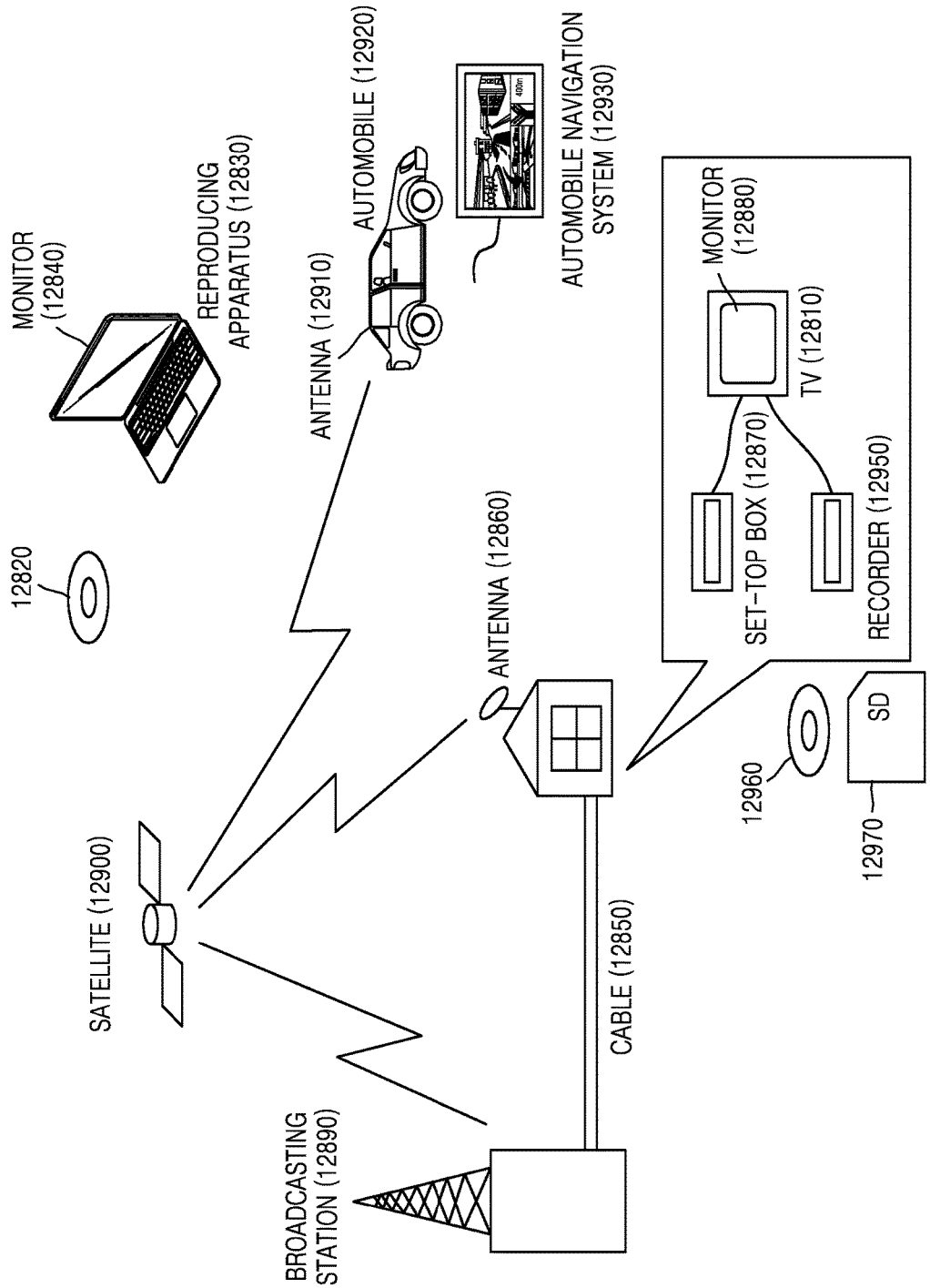
FIG. 26 illustrates a digital broadcasting system employing a communication system according to the present invention.

A communication system according to an embodiment is not limited to the communication system described above with reference to FIG. 24. For example, FIG. 26 illustrates a digital broadcasting system employing a communication system, according to various embodiments. The digital broadcasting system of FIG. 26 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to the exemplary embodiment is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the embodiment may be installed. Data output from the set-top box 12870 may also be reproduced on a TV monitor 12880.

As another example, the video decoding apparatus according to the embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to the embodiment and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the video encoder 12720 of FIG. 26. For example, the computer 12100 and the TV receiver 12810 may not include the camera 12530, the camera interface 12630, and the video encoder 12720 of FIG. 26.

Figure 27:
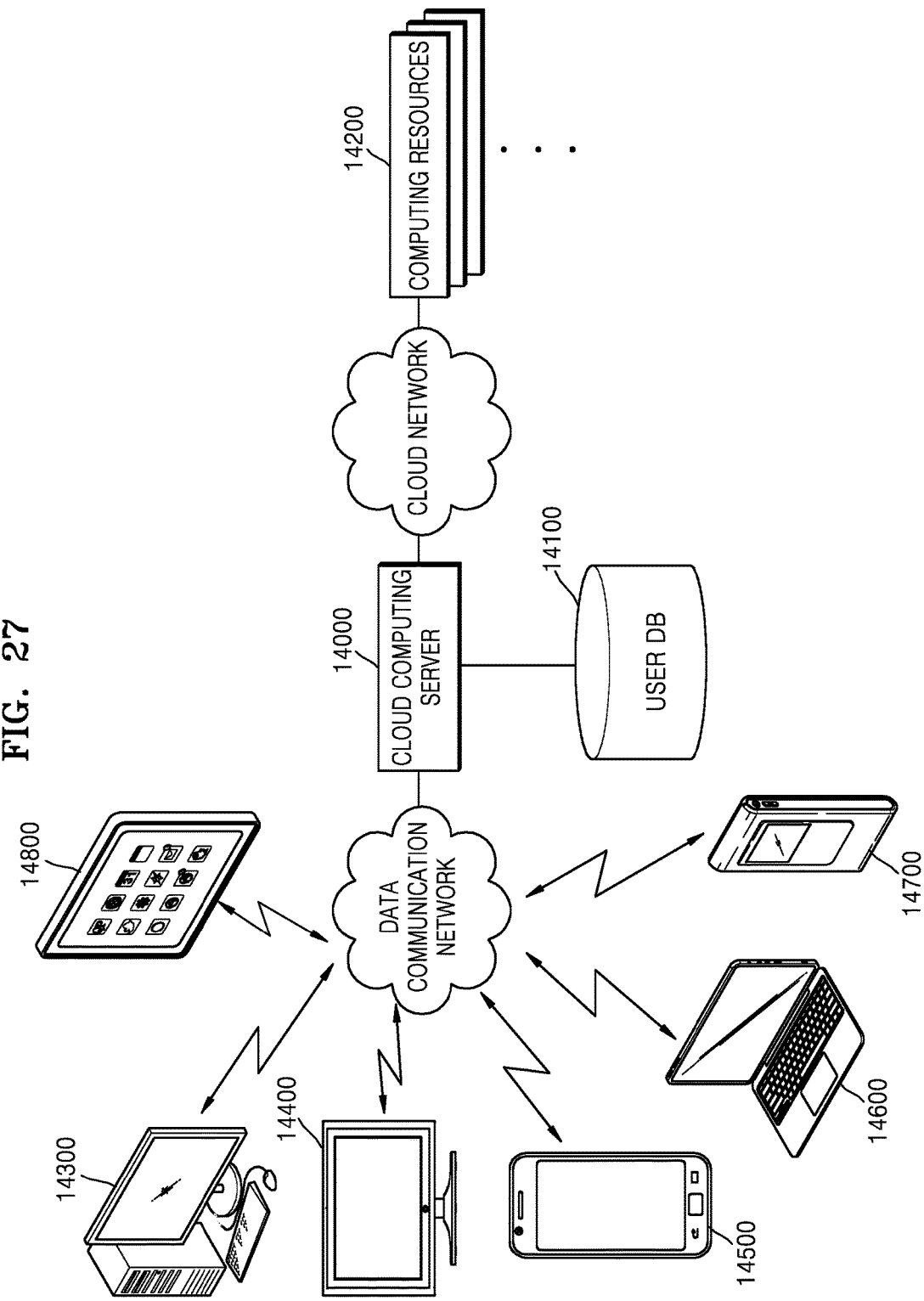
FIG. 27 illustrates a network structure of a cloud computing system using a video encoding apparatus and a video decoding apparatus, according to an embodiment of the present invention.

FIG. 27 is a diagram illustrating a network structure of a cloud computing system using a video encoding apparatus and a video decoding apparatus, according to various embodiments.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus as described above with reference to FIGS. 1A through 20. As another example, the user terminal may include the video encoding apparatus as described above with reference to FIGS. 1A through 20. Alternatively, the user terminal may include both the video decoding apparatus and the video encoding apparatus as described above with reference to FIGS. 1A through 20.

Various applications of the video encoding method, the video decoding method, the video encoding apparatus, and the video decoding apparatus according to the exemplary embodiments described above with reference to FIGS. 1A through 20 are described above with reference to FIGS. 21 through 27. However, methods of storing the video encoding method and the video decoding method in a storage medium or methods of implementing the video encoding apparatus and the video decoding apparatus in a device described above with reference to FIGS. 1A through 20 are not limited to the exemplary embodiments described above with reference to FIGS. 21 through 27.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A multilayer video decoding method that is implemented by at least one processor, the multilayer video decoding method comprising:
   obtaining, from a video parameter set network abstraction layer (VPS NAL) unit comprised in a bitstream, picture type alignment information indicating whether all pictures comprised in a same access unit have a same picture type;
   based on a value of the picture type alignment information being 0, obtaining, from the VPS NAL unit, intra random access point (IRAP) alignment information indicating whether all pictures referring to an IRAP picture have a same picture type as the IRAP picture;
   based on a value of the IRAP alignment information being 1, obtaining, from the VPS NAL unit, instantaneous decoder refresh (IDR) alignment information indicating that all pictures in the same access unit are IDR pictures when at least one picture of the same access unit is an IRAP picture for each access unit referring to the VPS NAL unit; and
   reconstructing a multilayer video by decoding encoded data by using the IDR alignment information,
   wherein the reconstructing of the multilayer video by decoding the encoded data comprises:
   based on a value of the IDR alignment information being 1 and at least one picture of the same access unit being the IRAP picture, determining to not read, from the bitstream, picture order count (POC) information regarding the pictures in the same access unit initializing POC of a decoded picture buffer (DPB), and decoding the pictures in the same access unit without using POC.

2. The multilayer video decoding method of claim 1, wherein, based on a value of the IDR alignment information being 1 and at least one IRAP picture is comprised in the same access unit,
   the at least one IRAP picture is limited to being an IDR picture.

3. The multilayer video decoding method of claim 1, wherein, based on a value of the IDR alignment information being 1 and at least one IRAP picture is comprised in the same access unit,
   all pictures comprised in the same access unit are limited to being IDR pictures.

4. The multilayer video decoding method of claim 1, wherein the same access unit comprises pictures whose POCs are equal to each other from among pictures comprised in the multilayer video.

5. A multilayer video decoding apparatus comprising at least one Decoded Picture Buffer (DPB) and at least one processor, wherein the at least one processor is configured to:
   obtain, from a video parameter set network abstraction layer (VPS NAL) unit comprised in a bitstream, picture type alignment information indicating whether all pictures comprised in a same access unit have a same picture type,
   based on a value of the picture type alignment information being 0, obtain, from the VPS NAL unit, intra random access point (IRAP) alignment information indicating whether all pictures referring to an IRAP picture have a same picture type as the IRAP picture,
   based on a value of the IRAP alignment information being 1, obtain, from the VPS NAL unit, instantaneous decoder refresh (IDR) alignment information indicating that all pictures in the same access unit are IDR pictures when at least one picture of the same access unit is an IRAP picture for each access unit referring to the VPS NAL unit, and
   reconstruct a multilayer video by decoding encoded data by using the IDR alignment information,
   wherein the at least one processor is further configured to:
   based on a value of the IDR alignment information being 1 and at least one picture of the same access unit is the IRAP picture, reconstruct a multilayer video, by determining to not read, from the bitstream, picture order count (POC) information regarding the pictures in the same access unit initializing POC of a decoded picture buffer (DPB), and decoding the pictures in the same access unit without using POC.

6. The multilayer video decoding apparatus of claim 5, wherein, based on a value of the IDR alignment information being 1 and at least one IRAP picture is comprised in the same access unit,
   the at least one IRAP picture is limited to being an IDR picture.

7. The multilayer video decoding apparatus of claim 5, wherein, based on a value of the IDR alignment information being 1 and at least one IRAP picture is comprised in the same access unit, all pictures comprised in the same access unit are limited to being IDR pictures.

8. The multilayer video decoding apparatus of claim 5, wherein the same access unit comprises pictures whose POCs are equal to each other from among pictures comprised in the multilayer video.

9. A multilayer video encoding method that is implemented by at least one processor, the multilayer video encoding method comprising:

generating base layer encoded data and enhancement layer encoded data by encoding an input image;

generating picture type alignment information indicating whether all pictures comprised in a same access unit have a same picture type, based on a value of the picture type alignment information being 0, generating intra random access point (IRAP) alignment information indicating whether all pictures referring to an IRAP picture have a same picture type as the IRAP picture, and based on a value of the IRAP alignment information being 1, generating instantaneous decoder refresh (IDR) alignment information indicating whether all pictures in the same access unit are IDR pictures when at least one picture of the same access unit is an IRAP picture; and generating a network abstraction layer (NAL) unit comprising the generated picture type alignment information, the generated IRAP alignment information, and the generated instantaneous decoder refresh (IDR) alignment information; and generating a bitstream comprising the NAL unit, wherein the generating of the base layer encoded data and the enhancement layer encoded data comprises setting all of corresponding pictures of other layers as IDR pictures, when a picture of any layer included in the same access unit is an IDR picture, wherein the NAL unit is a video parameter set network abstraction layer (VPS NAL) unit, and wherein the picture type alignment information, the IRAP alignment information, and the IDR alignment information are commonly used in decoding the base layer encoded data and the enhancement layer encoded data.

10. A non-transitory computer-readable recording medium having recorded thereon a program for executing the multilayer video decoding method of claim 1.

* * * * *